(12) United States Patent
Chen

(10) Patent No.: US 11,802,857 B2
(45) Date of Patent: Oct. 31, 2023

(54) MONITORING AND PREVENTING SUPPRESSOR FAILURES

(71) Applicant: DIONEX CORPORATION, Sunnyvale, CA (US)

(72) Inventor: Yongjing Chen, Sunnyvale, CA (US)

(73) Assignee: Dionex Corporation, Sunnyvale, CA (US)

(*) Notice: Subject to any disclaimer, the term of this patent is extended or adjusted under 35 U.S.C. 154(b) by 134 days.

(21) Appl. No.: 17/545,249

(22) Filed: Dec. 8, 2021

(65) Prior Publication Data

US 2023/0176019 A1 Jun. 8, 2023

(51) Int. Cl.
*G01N 30/96* (2006.01)
*H01J 49/04* (2006.01)

(52) U.S. Cl.
CPC .......... *G01N 30/96* (2013.01); *H01J 49/0431* (2013.01); *G01N 2030/965* (2013.01)

(58) Field of Classification Search
CPC .............. G01N 30/96; G01N 2030/965; H01J 49/0431
See application file for complete search history.

(56) References Cited

U.S. PATENT DOCUMENTS

| | | | |
|---|---|---|---|
| 2,521,741 A * | 9/1950 | Parker ...................... | H04N 3/16 315/371 |
| 6,783,645 B2 | 8/2004 | Cheng et al. | |
| 7,780,834 B2 | 8/2010 | Anderson et al. | |
| 8,342,007 B2 | 1/2013 | Cheng et al. | |
| 9,535,034 B2 | 1/2017 | Sakamoto et al. | |
| 10,877,005 B2 | 12/2020 | Cheng et al. | |
| 2003/0209439 A1* | 11/2003 | Anderson, Jr. ........ | B01D 15/08 204/647 |
| 2021/0132010 A1 | 5/2021 | Krummen et al. | |

FOREIGN PATENT DOCUMENTS

| | | |
|---|---|---|
| CN | 213210022 U | 5/2021 |
| JP | 2006145382 A | 6/2006 |
| KR | 101285479 B1 | 7/2013 |

OTHER PUBLICATIONS

Rohrer, Jeff, "Optimal Settings for Pulsed Amperometric Detection of Carbohydrates Using the Dionex ED40 Electrochemical Detector," Thermo Fisher, Technical Note 21, 2013, 4 pages.

(Continued)

*Primary Examiner* — David J Bolduc
(74) *Attorney, Agent, or Firm* — BakerHostetler

(57) ABSTRACT

The eluent used in IC separation contains non-volatile salt which is not compatible with electrospray ionization-mass spectrometry (ESI-MS). A suppressor is required to convert the non-volatile salt into water or the volatile acid form (i.e. acetic acid). When the suppressor fails, the non-volatile salts will enter the MS and cause extensive shutdown and maintenance of the mass spectrometer. The suppressor voltage derivative is used to evaluate the most common suppressor failure modes, including disruption of regenerant flow and excessive backpressure on the suppressor due to clogging in the downstream, and to trigger the eluent pump to stop the eluent flow or to trigger the auxiliary valve to switch the flow to the mass spectrometer from eluent to water.

20 Claims, 28 Drawing Sheets

(56) References Cited

OTHER PUBLICATIONS

Valentín-Blasini, et al., "Quantification of iodide and sodium-iodide symporter inhibitors in human urine using ion chromatography tandem mass spectrometry", J. Chromatogr A, vol. 1155, No. 1, pp. 40-46, 2007.
Hsu, "Interfacing ion chromatography with particle beam mass spectrometry for the determination of organic anionic compounds", Anal. Chem., vol. 64, No. 4, pp. 434-443, Feb. 15, 1992.
European Search Report issued in European Patent Application No. 22206197.0 dated Apr. 14, 2023.
Dionex ICS-1100 Ion Chromatography System Operator's Manual, Oct. 2012, Revision 3.
Melton et al. "The utilisation of ion chromatography and tandem mass spectrometry (IC-MS/MS) for the multi-residue simultaneous determination of highly polar anionic pesticides in fruit and vegetables" Food Chemistry, 2019, vol. 298, 8 pages.
Ivey et al. "Detection of phosphorous oxyanions in synthetic geothermal water using ion chromatography-mass spectrometry techniques" Journal of Chromatography A, Dec. 9, 2005, vol. 1098, pp. 95-103.

* cited by examiner

MONITORING AND PREVENTING
SUPPRESSOR FAILURES

BACKGROUND

Ion chromatography (IC) is a well-established analytical technique and for the past 40 years or so has been the preferred method for the determination of inorganic anions and small organic anions. IC is also used widely for the determination of inorganic cations, as well as carbohydrates and amino acids.

A suppressor is one of the components in an IC system. The function of the suppressor is to reduce the background conductivity of the eluent and increase the conductivity of the analytes via the ion-exchange process, thus increasing the response in the subsequent conductivity detection. The most popular commercial suppressors are in the form of a three-channel sandwich-type design, in which the eluent channel carrying the sample is separated by two ion exchange membranes from the flanking regenerant channels carrying water stream. A flat plate electrode is placed in each of the regenerant channels. A constant current is passed between the two electrodes. The electrolysis of water in the regenerant channels produces hydrogen ions and hydroxide ions, used for the suppression of the eluent. The continuous supply of water in the regenerant channel is critical to the stability of the suppressor performance.

In recent years, mass spectrometry (MS) has become the most widely accepted instrumentation for selective and sensitive detection. When coupled with liquid chromatography, including IC, atmospheric pressure ionization (API) MS (mostly in the form of electrospray ionization (ESI)) is a powerful tool for identification of compounds via determination of molecular mass or characteristic fragmentation of the analyte. IC interfaced with MS plays a major role in a variety of areas including trace analysis of molecular-mass inorganic and organic anions by IC-ESI/MS, speciation analysis and metallomics, mass isotopomer measurements of ionic species, organic trace analysis of molecular-mass analytes, and glycans and other complex carbohydrates analysis.

The eluent used in IC separation contains non-volatile salt which is not compatible with ESI-MS. The suppressor is a critical component used to convert the non-volatile salt into water or the volatile acid form (i.e. acetic acid (HOAc)). For glycans and other complex carbohydrates analysis in particular, various complex gradients using high concentration of sodium acetate (NaOAc)/sodium hydroxide (NaOH) eluents are often required. When the suppressor fails, the non-volatile salts will enter the MS and cause it to be shut down and require extensive service of the mass spectrometer. The most common cases of suppressor failures involve loss of water supply in the regenerant channels from water reservoir runout or pump shutdown or broken connecting tubing, and suppressor leaks due to excessive backpressure downstream.

BRIEF SUMMARY

A method for monitoring the status of the suppressor which automatically prevents the eluent from reaching the mass spectrometer in the case of a suppressor failure. The suppressor voltage derivative is used to monitor the suppressor status. It has been demonstrated that the most common suppressor failure modes, including disruption of regenerant flow and excessive backpressure on the suppressor due to clogging in the downstream, can be used to trigger the eluent pump to stop the eluent flow or to trigger the auxiliary valve to switch the flow to the mass spectrometer from eluent to water. The method doesn't require any additional sensors, which eliminates the need for complex setup and the associated additional peak dispersion for the MS detection. The method applies to both the high-performance anion-exchange chromatography (HPAE) system with manually prepared sodium acetate/sodium hydroxide eluent and regen-free ion chromatography (RFIC) system with electrolytically generated eluent, coupled with MS, respectively.

A method for detecting suppressor failure of a suppressor fluidically coupled to a chromatography column comprises several steps: Flowing an eluent from the chromatography column to a suppressor. Applying electrical current to and from a negative and a positive electrode of the suppressor. Measuring the voltage across the negative and positive electrodes of the suppressor. Calculating a monitored value. Upon detecting the monitored value above a threshold value determining that there is a suppressor failure.

A system control unit for a chromatography system comprises a chromatography column fluidically coupled to a suppressor, wherein the system control unit is configured to: measure the voltage across the negative and positive electrodes of the suppressor; calculate a monitored value; and determine that there is a suppressor failure upon detecting the monitored value is above a threshold value.

The monitored value is one of: a) The time derivative of the voltage. b) The time derivative of the moving average voltage, wherein the moving average voltage is the average voltage of 2 to 20 measurements. c) The moving average of the time derivative of the voltage, wherein the moving average of the time derivative is the average time derivative of 2 to 20 time derivatives. d) The moving average of the time derivative of the moving average of the voltage. e) The higher time derivative of the voltage. f) The higher time derivative of the moving average voltage. g) The moving average of the higher time derivative of the voltage.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

Figure 1:
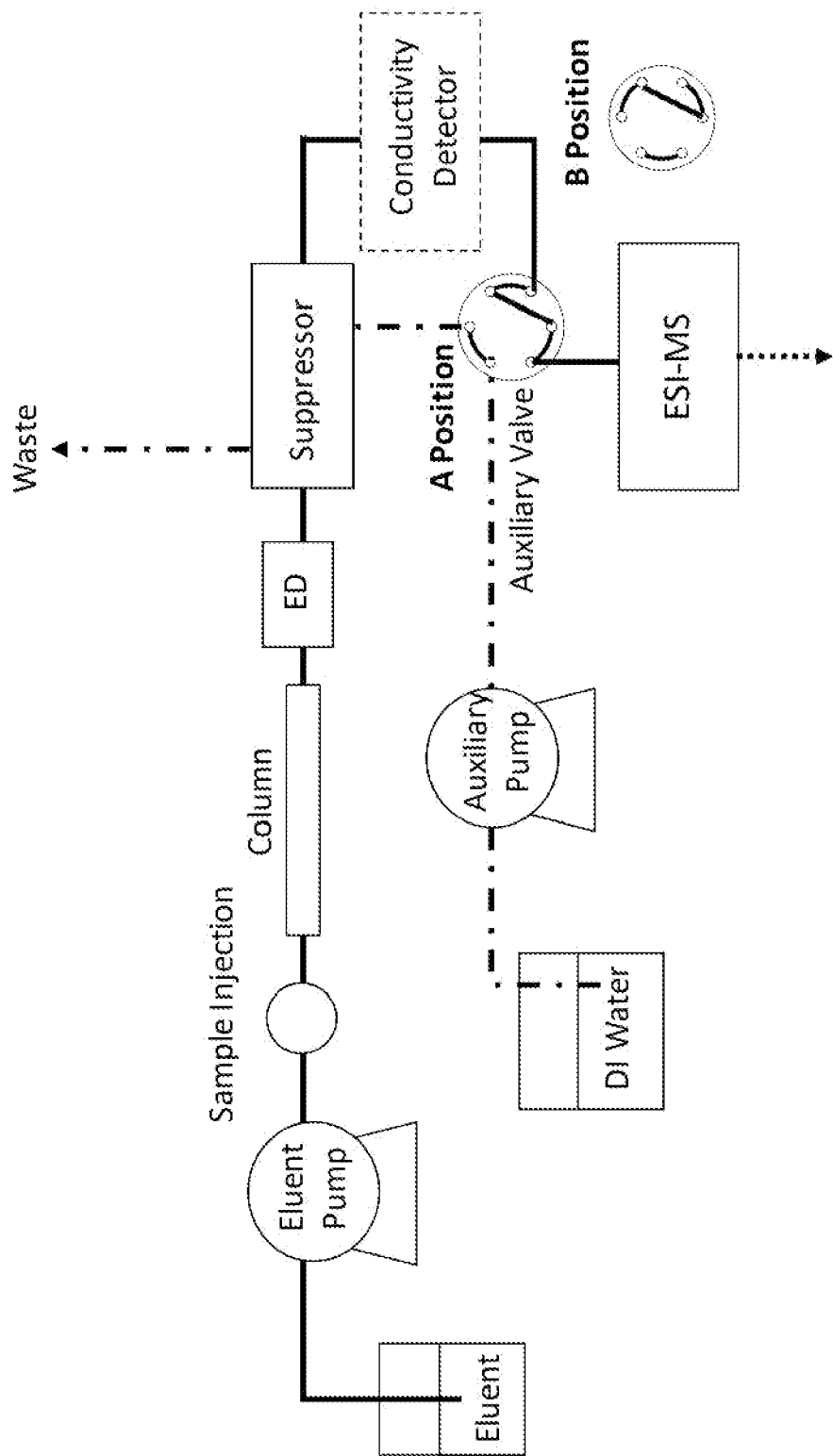
FIG. 1 is flow schematic of an embodiment for an ion chromatography-mass spectroscopy (IC-MS) system with an auxiliary valve.
Figure 2:
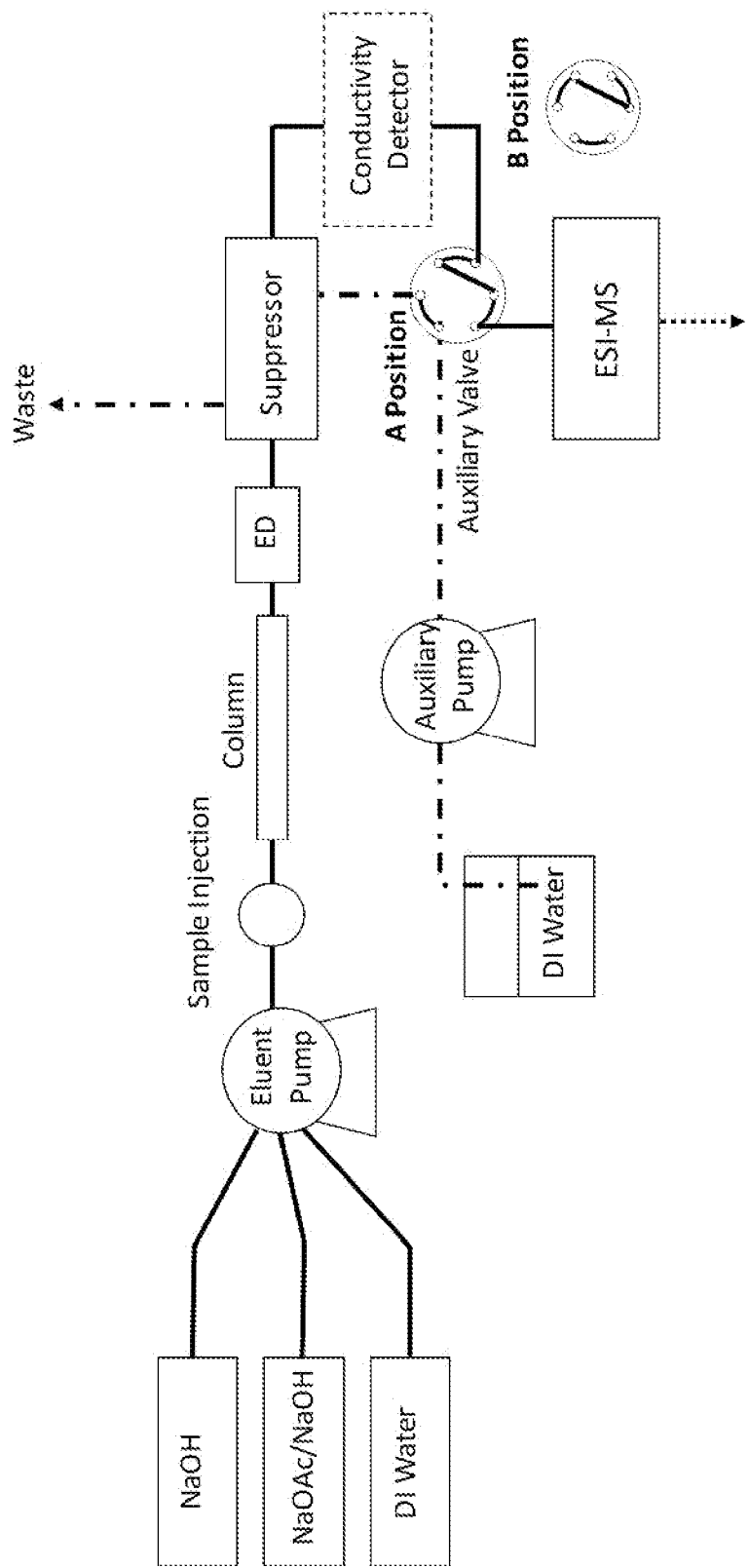
FIG. 2 is flow schematic of an embodiment for a high-performance anion-exchange chromatography mass spectrometry (HPAE-MS) system with an auxiliary valve for complex carbohydrate analysis.
Figure 3:
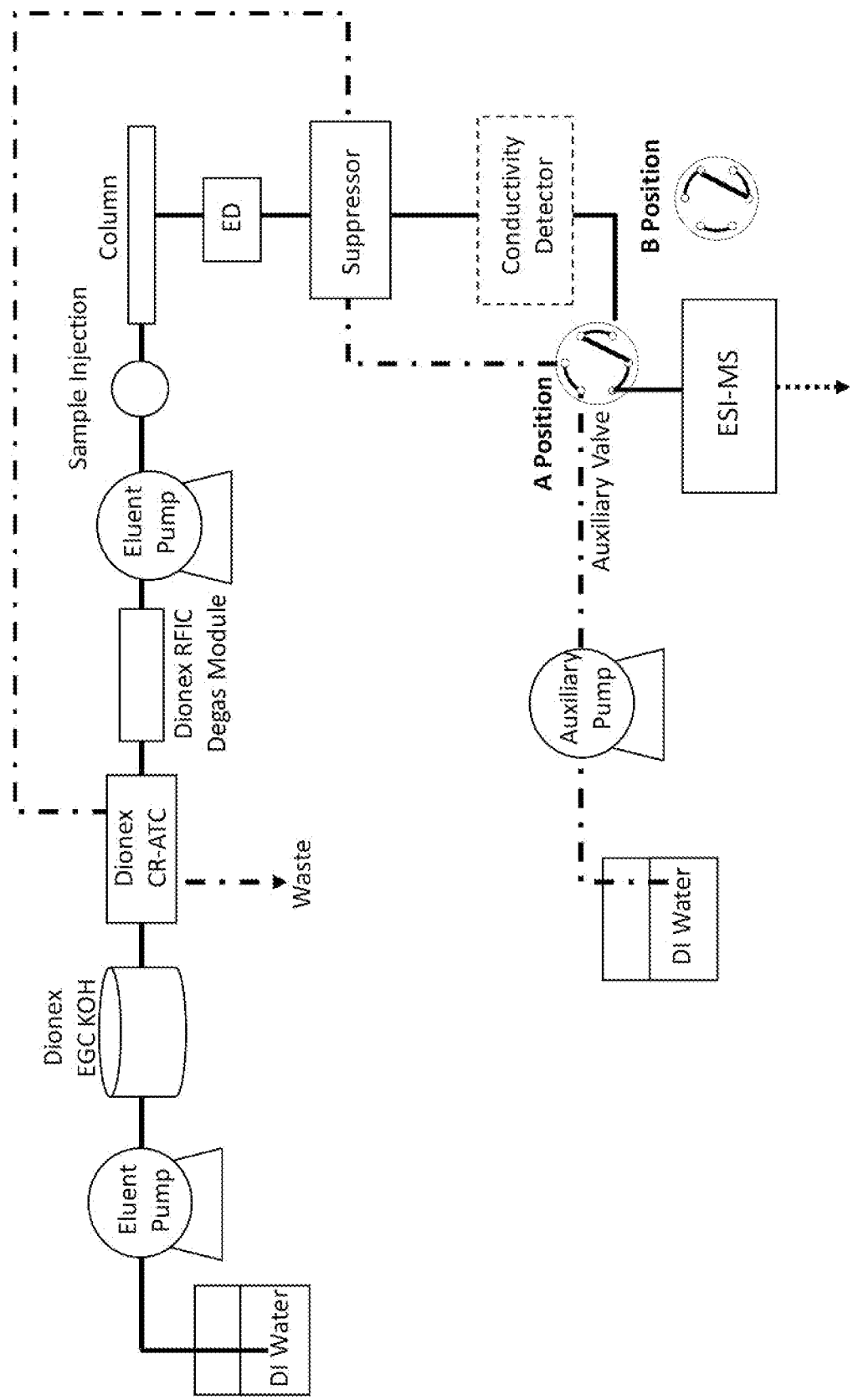
FIG. 3 is flow schematic of an embodiment for a regen-free ion chromatography mass spectrometry (RFIC-MS) system with an auxiliary valve for cation/anion analysis.

The eluent used in IC separation contains non-volatile salt which is not compatible with electrospray ionization-mass spectrometry (ESI-MS). A suppressor is required to convert the non-volatile salt into water or the volatile acid form (e.g. acetic acid). When the suppressor fails, the non-volatile salts will enter the MS and cause it to be shut down and require extensive service of the mass spectrometer. The described method provides a way of detecting when the suppressor has failed which will allow intervention to prevent damage to the MS. The method uses the time derivative of the suppressor voltage to capture the most common suppressor failure modes including disruption of regenerant flow and excessive backpressure on the suppressor due to clogging downstream. Once a suppressor failure mode has been determined it may trigger the eluent pump to stop the eluent flow or to trigger the auxiliary valve to switch the flow to the mass spectrometer from the eluent to another liquid. The method doesn't require any additional sensors, which eliminates the need for complex setup and the associated additional peak dispersion for the MS detection.

For self-regenerated suppressors, constant current is applied to the electrodes to cause the water electrolysis for continuous supply of hydrogen or hydroxide ions for the eluent suppression. The voltage across the channels in the suppressor can be affected by various factors, such as eluent concentration, eluent and regenerant flow rates etc. When the water supply in the regenerant channels is interrupted, e.g. no water flow from water reservoir runout or pump shutdown, or disrupted flows (eluent flow or regenerant flow) from excessive backpressure due to clogging in the downstream, the voltage is affected.

As the absolute values of the suppressor voltage are subjected to various factors including the variations from manufacturing, the slope of the voltage, i.e. how fast the voltage changes, is used to derive the voltage patterns caused by suppressor failures.

A method for detecting suppressor failure of a suppressor fluidically coupled to a chromatography column comprises several steps: Flowing an eluent from the chromatography column to a suppressor. Applying electrical current to and from a negative and a positive electrode of the suppressor. Measuring the voltage across the negative and positive electrodes of the suppressor. Calculating a monitored value. Upon detecting the monitored value above a threshold value determining that there is a suppressor failure.

In some embodiments, a system control unit for a chromatography system comprises a chromatography column fluidically coupled to a suppressor, wherein the system control unit is configured to: measure the voltage across the negative and positive electrodes of the suppressor; calculate a monitored value; and determine that there is a suppressor failure upon detecting the monitored value is above a threshold value.

The monitored value is one of: a) The time derivative of the voltage. b) The time derivative of the moving average voltage, wherein the moving average voltage is the average voltage of 2 to 20 measurements. c) The moving average of the time derivative of the voltage, wherein the moving average of the time derivative is the average time derivative of 2 to 20 time derivatives. d) The moving average of the time derivative of the moving average of the voltage. e) The higher time derivative of the voltage. f) The higher time derivative of the moving average voltage. g) The moving average of the higher time derivative of the voltage.

The time derivative of the voltage is the first derivative of the voltage over time. It may be calculated by: time derivative of voltage=$(V_2-V_1)/(t_2-t_1)$; where $V_1$ and $V_2$ are the voltage at two different points in time, with $V_1$ being before $V_2$; and $t_1$ and $t_2$ are the respective times the voltages are measured. The time derivative of the moving average voltage is the first derivative of the moving average of the voltage over time. The moving average is the average of a sequence of measurements, such as 2 to 20 measurements. A moving average may be the moving average of the voltage measurements, or it may be the moving average of the calculated time derivative or higher time derivative. For example, the moving average of the voltage is calculated as, the sum of the voltages divided by the number of voltage measurements (moving average of $V=(V_1+V_2+ \ldots +V_{n-1}+V_n)/n$, where V is the moving average of the voltage, $V_1$ is the first voltage measurement, $V_2$ is the second, etc., and n is the number of measurements). A higher time derivative may be calculated as one or more time derivative of the voltage. For example, the second time derivative of the voltage may be calculated as: second time derivative of voltage=$(TD_2-TD_1)(tt_2-tt_1)$; where $TD_1$ and $TD_2$ are the time derivates of the voltage; and $tt_1$ and $tt_2$ are the respective times of $TD_1$ and $TD_2$. A higher time derivative may be a second, third, or fourth time derivative. In some embodiments, the higher time derivative is the second time derivative. The voltage is constantly measured as long as the suppressor current is on.

In some embodiments, the monitored value is selected from: a) the time derivative of the voltage; b) the time derivative of the moving average voltage, wherein the moving average voltage is the average voltage of 2 to 20 measurements; c) the moving average of the time derivative of the voltage, wherein the moving average of the time derivative is the average time derivative of 2 to 20 time derivatives; d) the moving average of the time derivative of the moving average of the voltage; e) the higher time derivative of the voltage; f) the higher time derivative of the moving average voltage; and g) the moving average of the higher time derivative of the voltage. In some embodiments, the monitored value is the derivative of the voltage. In some embodiments, the monitored value is the time derivative of the moving average voltage. In some embodiments, the monitored value is the moving average of the time derivative of the voltage. In some embodiments, the monitored value is the second time derivative of the voltage. In some embodiments, the higher time derivative is the second time derivative.

The eluent comprises a salt. In some embodiments, the mixture of salts (e.g. NaOAc/NaOH eluent) is converted in the suppressor to a form (e.g. HOAc/NaOAc) that the use of a single conductivity detector is not effective in indicating the composition of the converted form. The suppression efficiency of the suppressor affects the composition of the converted form. Examples of salts include a mixture of alkali acetate and alkali hydroxide, or alkali hydroxide, or alkali carbonate, or a mixture of alkali carbonate and bicarbonate, or a strong acid. In some embodiments, the eluent comprises a mixture of alkali acetate and alkali hydroxide. In some embodiments, the eluent comprises alkali hydroxide. In some embodiments, the eluent comprises alkali carbonate. In some embodiments, the eluent comprises a mixture of alkali carbonate and bicarbonate. In some embodiments, the eluent comprises a strong acid.

When the monitored value exceeds a threshold value, a suppressor failure is detected. The threshold value is a pre-determined value. In some embodiments, the pre-determined value is a percentage of the voltage when the suppressor is functioning properly, such as 5% or 10%. In some embodiments, the pre-determined value or the percentage is determined empirically. The threshold value may be changed depending on the eluent used, the concentration gradient used, the flow rate of the eluent in the chromatography. In some embodiments, the threshold value may be changed during the analysis of a sample. Upon determining that there is a suppressor failure, various actions may be taken to prevent salt from flowing into the mass spectrometer. In some embodiments, after a suppressor failure is detected, the pump that flows the eluent is stopped. In some embodiments, after a suppressor failure is detected, the flow from the suppressor to the mass spectrometer is interrupted. In some embodiments, after a suppressor failure is detected, the flow from the suppressor to the mass spectrometer is interrupted and a liquid comprising water (such as DI water) replaces the flow that would go to the mass spectrometer.

A threshold can be set based on the types of the suppressor and the system and used to shut down the eluent pump to stop the eluent flow from reaching the mass spectrometer. In some embodiments, a 6-port injection valve is installed as an auxiliary valve between the suppressor (or the optional conductivity detector) and the mass spectrometer. When the auxiliary valve is at A position, the system operates correctly with eluent flowing through suppressor and reaching the mass spectrometer, and the auxiliary pump delivering DI water regenerant for the suppressor. When the monitored value reaches a pre-set threshold indicating a suppressor failure, the auxiliary valve is triggered to B position, where the eluent flow is switched to the suppressor Regen In, and the auxiliary pump delivers DI water to the mass spectrometer.

The chromatography system may be setup with different components and in various arrangements. In some embodiments, the eluent flows from the chromatography column to the suppressor then to a conductivity cell before reaching the MS.

Changes of regenerant water flow rate show as spikes in the profile of the slope data. When there is no change or very little change in the regenerant flow, which doesn't affect the suppression performance, the slope data are shown as a flat line with evenly distributed electronic noises. When the flow is interrupted, i.e. loss or reduce in regenerant flow, negative spikes are registered in the graph of voltage slope plotted against time. The magnitude of the negative spike is associated with the rate of the regenerant flow loss. When the eluent flow is obstructed due to clogging in the downstream, a positive or negative spike (depending on the types of suppressors) is registered in the graph of voltage slope plotted against time. The magnitude of the spike is associated with the magnitude of the pressure increase.

In the present disclosure the singular forms "a", "an" and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

The modifier "about" should be considered as disclosing the range defined by the absolute values of the two endpoints. For example, the expression "from about 2 to about 4" also discloses the range "from 2 to 4." When used to modify a single number, the term "about" may refer to plus or minus 10% of the indicated number and includes the indicated number. For example, "about 10%" may indicate a range of 9% to 11%, and "about 1" means from 0.9 to 1.1.

Where present, all ranges are inclusive and combinable. That is, references to values stated in ranges include every value within that range. For example, a range defined as from 400 to 450 ppm includes 400 ppm and 450 ppm as independent embodiments. Ranges of 400 to 450 ppm and 450 to 500 ppm may be combined to be a range of 400 to 500 ppm.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiment s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art. Furthermore, features from separate lists can be combined; and features from the examples can be generalized to the whole disclosure.

EXAMPLES

Figure 4:
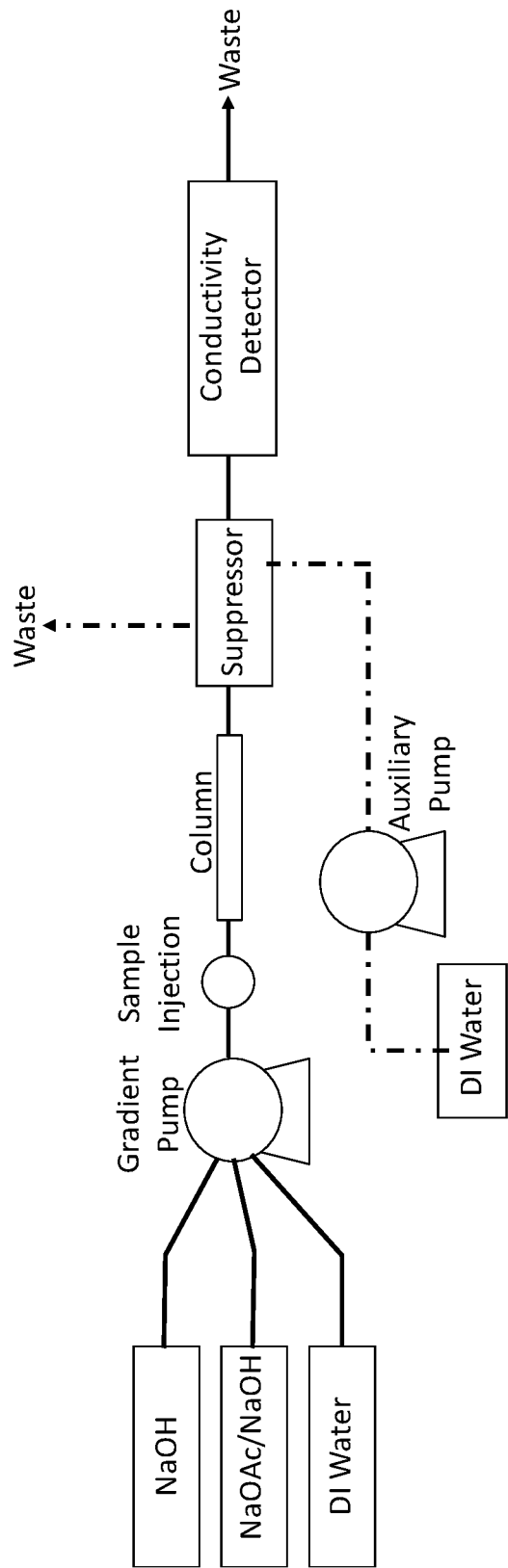
FIG. 4 is schematic of the HPAE system, coupled with a conductivity detector for a feasibility study.
Figure 5:
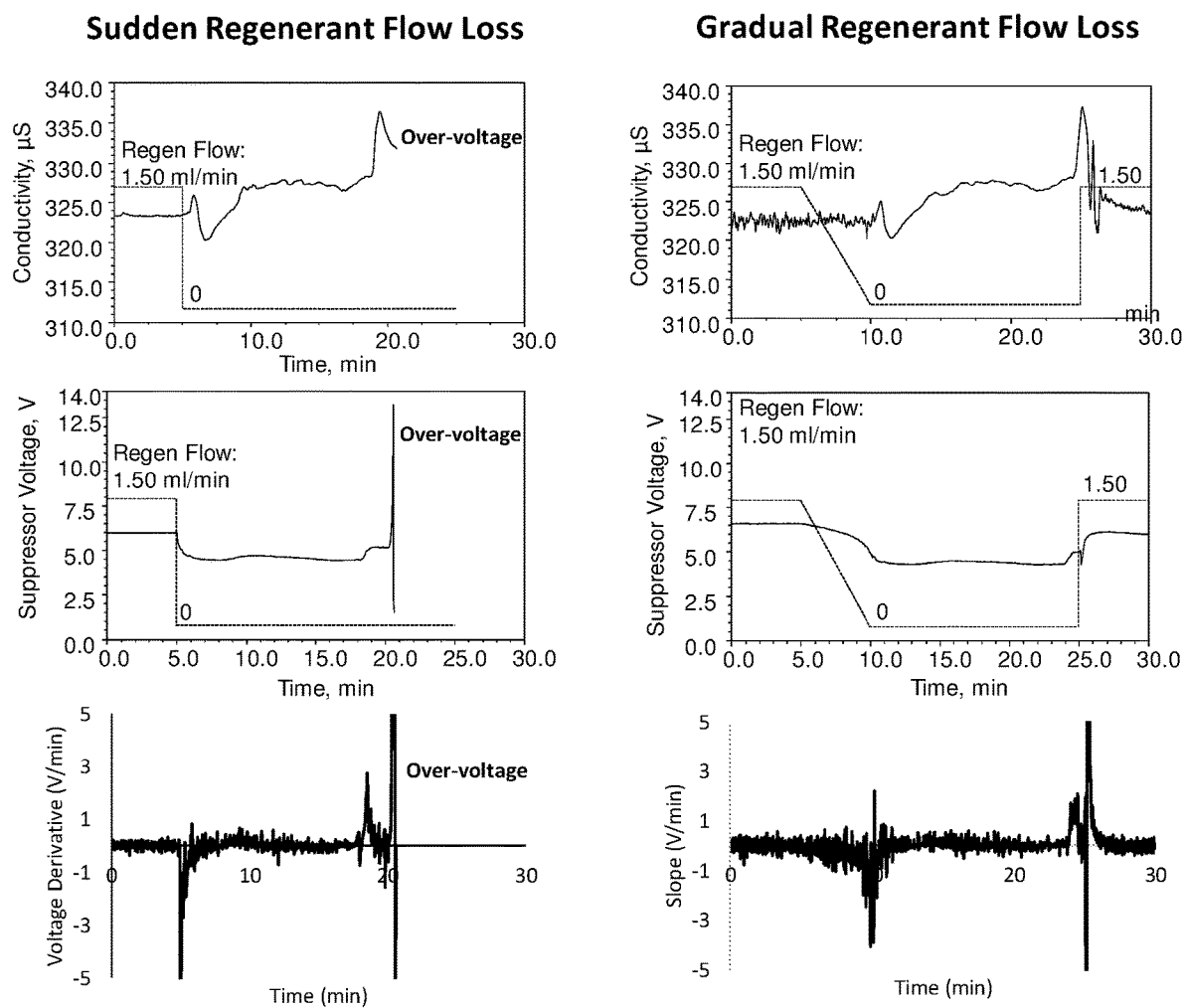
FIG. 5 are conductivity, suppressor voltage, and voltage derivative profiles of an isocratic eluent condition. Eluent flow rate: 0.25 mL/min; Suppressor: Thermo Scientific Dionex ERD 500 2-mm. Eluent: 50 mM NaOAc/100 mM NaOH; eluent flow rate: 0.25 mL/min; Regenerant: DI water; suppressor current: 150 mA. Sudden regenerant flow loss: regenerant flow rate: 1.5 mL/min 0-5 min; 0 mL/min during 5-25 min, 1.5 mL/min during 25-30 min. Gradual regenerant flow loss: regenerant flow rate: 1.5 mL/min 0-5 min; 1.5-0 mL/min during 5-10 min, 0 mL/min during 10-25 min; 1.5 mL/min during 25-30 min.
Figure 6:
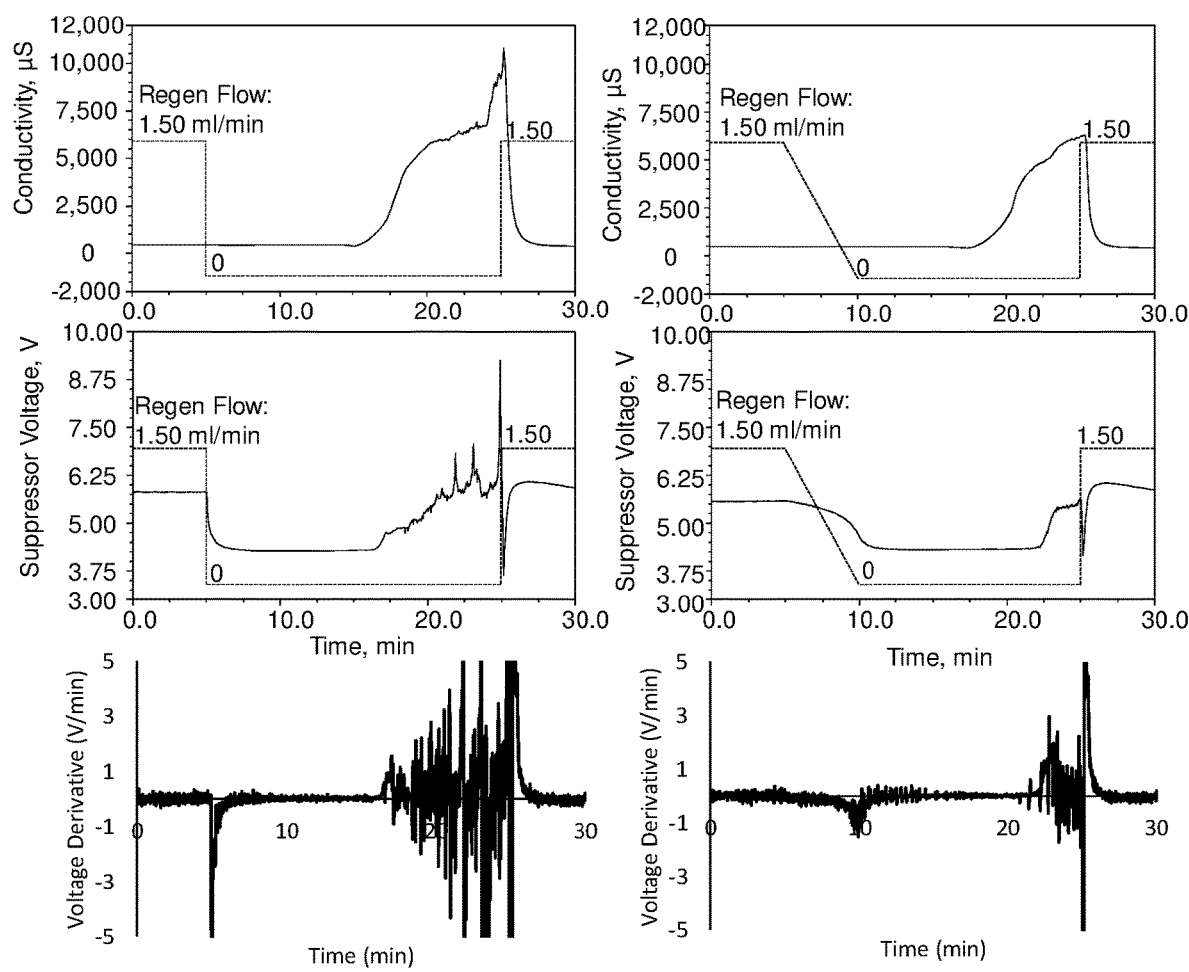
FIG. 6 are conductivity, suppressor voltage, and voltage derivative profiles of an isocratic eluent condition. Eluent flow rate: 0.25 mL/min; Suppressor: Thermo Scientific Dionex ERD 500 2-mm. Eluent: 100 mM NaOAc/100 mM NaOH; eluent flow rate: 0.25 mL/min; Regenerant: DI water; suppressor current: 150 mA. Sudden regenerant flow loss: regenerant flow rate: 1.5 mL/min 0-5 min; 0 mL/min during 5-25 min, 1.5 mL/min during 25-30 min. Gradual regenerant flow loss: regenerant flow rate: 1.5 mL/min 0-5 min; 1.5-0 mL/min during 5-10 min, 0 mL/min during 10-25 min; 1.5 mL/min during 25-30 min.
Figure 7:
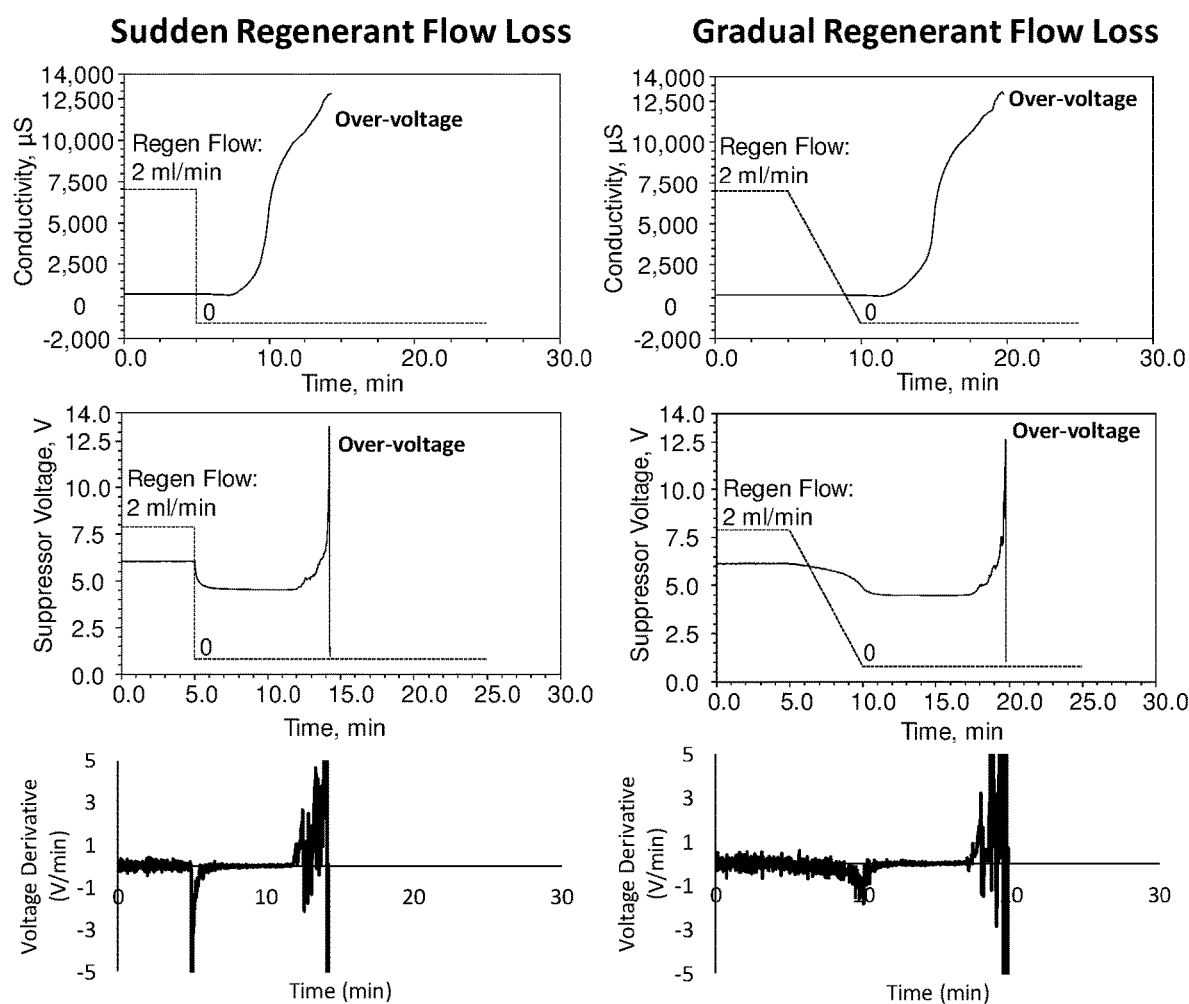
FIG. 7 are conductivity, suppressor voltage, and voltage derivative profiles of an isocratic eluent condition. Eluent flow rate: 0.25 mL/min; Suppressor: Thermo Scientific Dionex ERD 500 2-mm. Eluent: 250 mM NaOAc/100 mM NaOH; eluent flow rate: 0.25 mL/min; Regenerant: DI water; suppressor current: 200 mA. Sudden regenerant flow loss: regenerant flow rate: 2 mL/min 0-5 min; 0 mL/min during 5-25 min, 2 mL/min during 25-30 min. Gradual regenerant flow loss: regenerant flow rate: 2 mL/min 0-5 min; 2-0 mL/min during 5-10 min, 0 mL/min during 10-25 min; 2 mL/min during 25-30 min.
Figure 8:
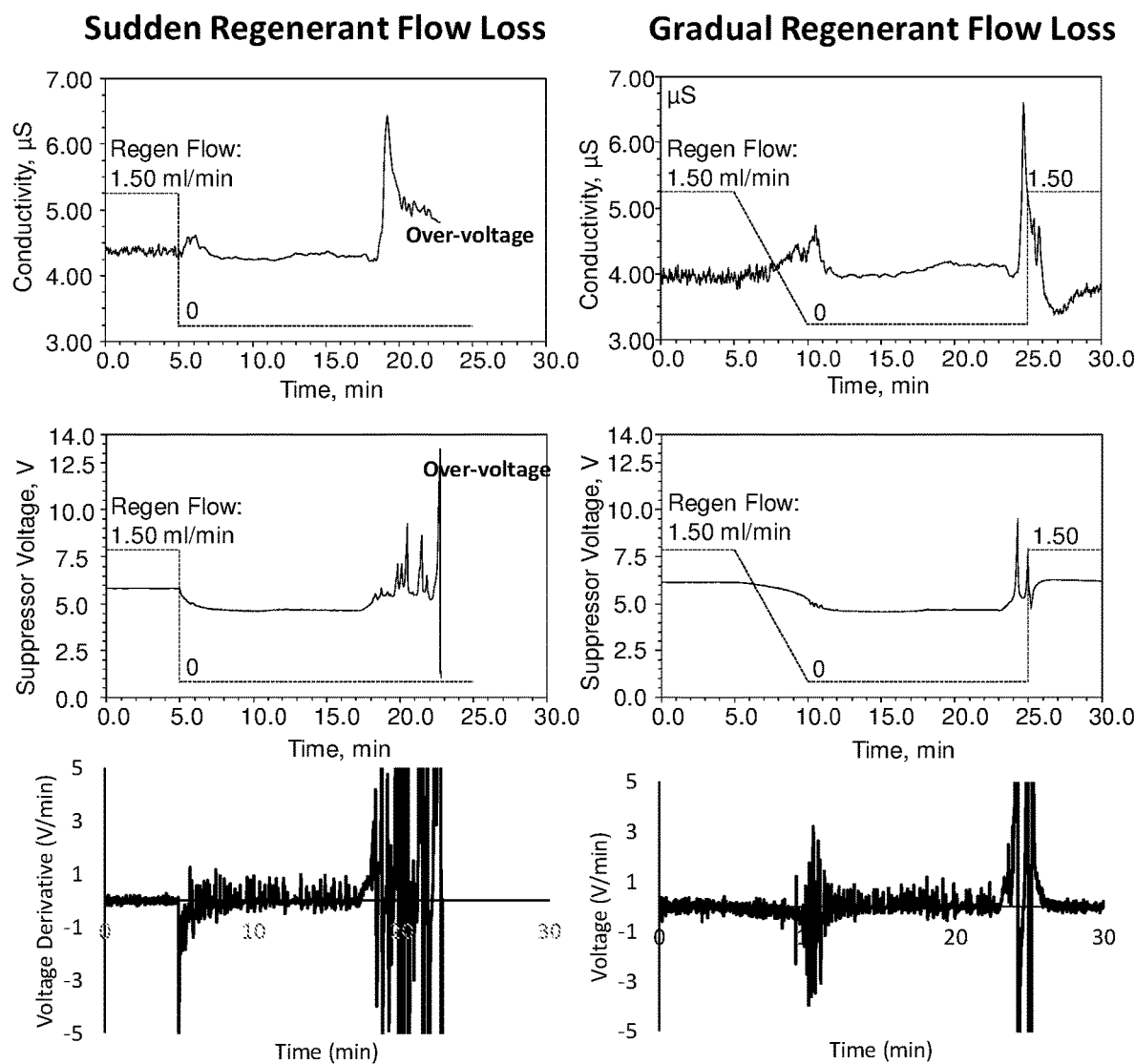
FIG. 8 are conductivity, suppressor voltage, and voltage derivative profiles of an isocratic eluent condition. Eluent flow rate: 0.25 mL/min; Suppressor: Thermo Scientific Dionex ERD 500 2-mm. Eluent: 100 mM NaOH; eluent flow rate: 0.25 mL/min; Regenerant: DI water; suppressor current: 150 mA. Sudden regenerant flow loss: regenerant flow rate: 1.5 mL/min 0-5 min; 0 mL/min during 5-25 min, 1.5 mL/min during 25-30 min. Gradual regenerant flow loss: regenerant flow rate: 1.5 mL/min 0-5 min; 1.5-0 mL/min during 5-10 min, 0 mL/min during 10-25 min; 1.5 mL/min during 25-30 min.

Example 1: Sudden Loss and Gradual Loss of Regen Flows in Isocratic Eluent Conditions A series of eluent conditions were examined for sudden loss (simulating water reservoir runout and pump shutdown) and gradual loss (simulating channel leaks) of the regenerant water flow on a HPAE system with manually prepared eluent (FIG. 4). As the typical eluent conditions used for complex carbohydrates separation are varied NaOAc gradients in constant 100 mM NaOH, eluents of 50 mM (FIG. 5), 100 mM (FIG. 6), and 250 mM NaOAc (FIG. 7) in 100 mM NaOH were tested. To cover the NaOH eluent system, 100 mM NaOH eluent was also tested (FIG. 8). In the sudden loss of the regenerant water flow testing, the regenerant flow was set to zero at 5 min and was set to normal flow rate at 25 min to re-equilibrate for the next run. In the gradual loss of the regenerant water flow testing, the regenerant flow was set to drop from the normal flow rate to zero during 5-10 min and was set back to normal flow rate at 25 min to re-equilibrate for the next run. The dashed lines indicate the flow of the regenerant.

For the sudden regenerant flow loss, an instant spike (magnitude larger than −5 V/min) in the voltage derivative signal is registered at 5 min in all the cases as shown in FIG. 5-8. Depending on the eluent concentration, an increase in conductivity in response to the stop of the regenerant flow shows up within a few minutes. The instant spike in the voltage derivative can be used to trigger the eluent pump to stop before the salts start to break through.

For the gradual regenerant flow loss, a consistent spike of magnitude larger than −1 V/min is observed at around or leading up to 10 min where the flow finally stops. Within a few minutes, the conductivity starts to increase, indicating the breakthrough of the salts. Therefore, a threshold can be used for the trigger mechanism.

Figure 9A:
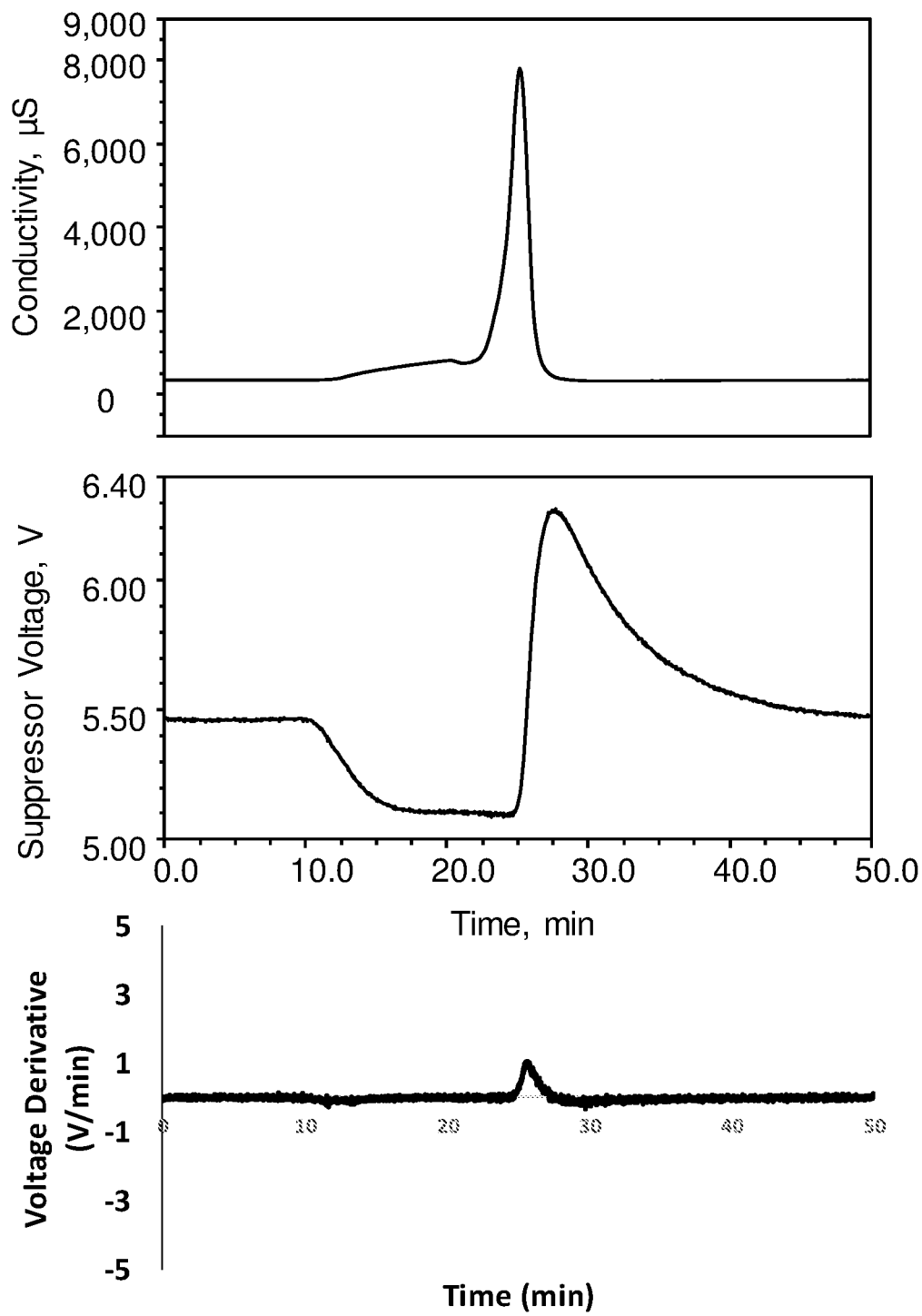
FIG. 9(A) are conductivity, suppressor voltage, and voltage derivative profiles of a NaOAc/NaOH gradient eluent with normal regenerant flow. Eluent: 10 mM NaOAc/100 mM NaOH during 0-5 min; 10 mM NaOAc to 100 mM NaOAc in 100 mM NaOH during 5-20 min; 100 mM NaOAc/100 mM NaOH during 20-50 min; eluent flow rate: 0.25 mL/min; normal regenerant flow rate: 1.5 mL/min; suppressor: Thermo Scientific Dionex ERD 500 2-mm; suppressor current: 150 mA.

Example 2: Sudden Loss and Gradual Loss of Regen Flows in Gradient Eluent Conditions The effect of sudden loss (simulating water reservoir runout and pump shutdown) and gradual loss (simulating channel leaks) of the regenerant water flow was also examined in manually prepared eluent gradient condition, in NaOAc/NaOH (FIGS. 9(A)-9(C)) and NaOH (FIGS. 10(A)-10(C)) eluent systems respectively (FIG. 4). The normal regenerant flow for NaOAc/NaOH and NaOH are depicted in FIGS. 9(A) and 10(A), respectively. In the sudden loss of the regenerant water flow testing, the regenerant flow was set to zero at 10 min and was set to normal flow rate at 40 min to re-equilibrate for the next run, FIGS. 9(B) and 10(B). In the gradual loss of the regenerant water flow testing, FIGS. 9(C) and 10(C), the regenerant flow was set to drop from the normal flow rate to zero during 0-10 min and was set back to normal flow rate at 40 min to re-equilibrate for the next run (as indicated in the green dash lines in FIG. 9).

Figure 9B:
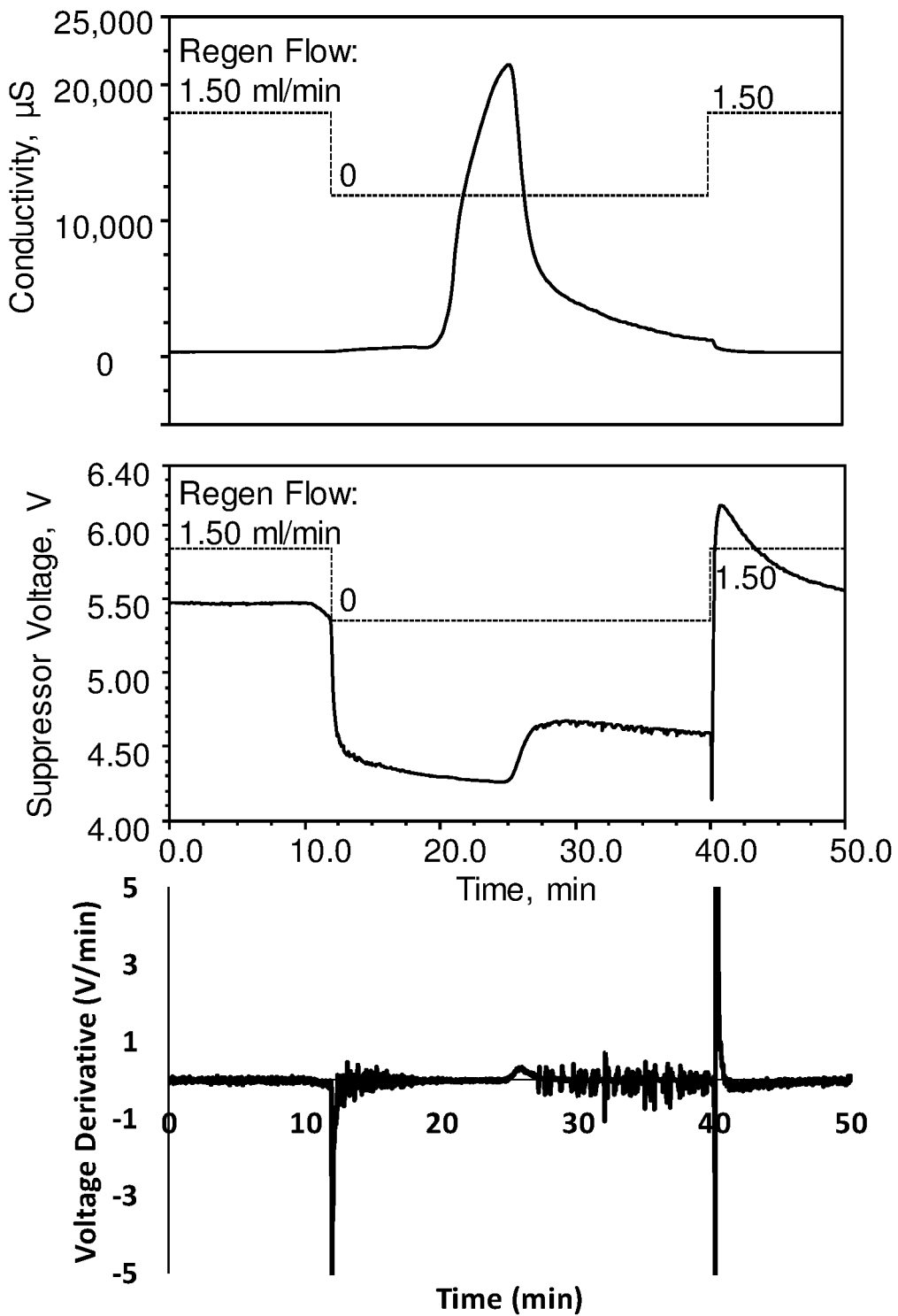
FIG. 9(B) are conductivity, suppressor voltage, and voltage derivative profiles of a NaOAc/NaOH gradient eluent with sudden regenerant flow loss. Eluent: 10 mM NaOAc/100 mM NaOH during 0-5 min; 10 mM NaOAc to 100 mM NaOAc in 100 mM NaOH during 5-20 min; 100 mM NaOAc/100 mM NaOH during 20-50 min; eluent flow rate: 0.25 mL/min; regenerant flow rate: 1.5 mL/min during 0-10 min, 0 mL/min during 10-40 min, 1.5 mL/min during 40-50 min; suppressor: Thermo Scientific Dionex ERD 500 2-mm; suppressor current: 150 mA.
Figure 9C:
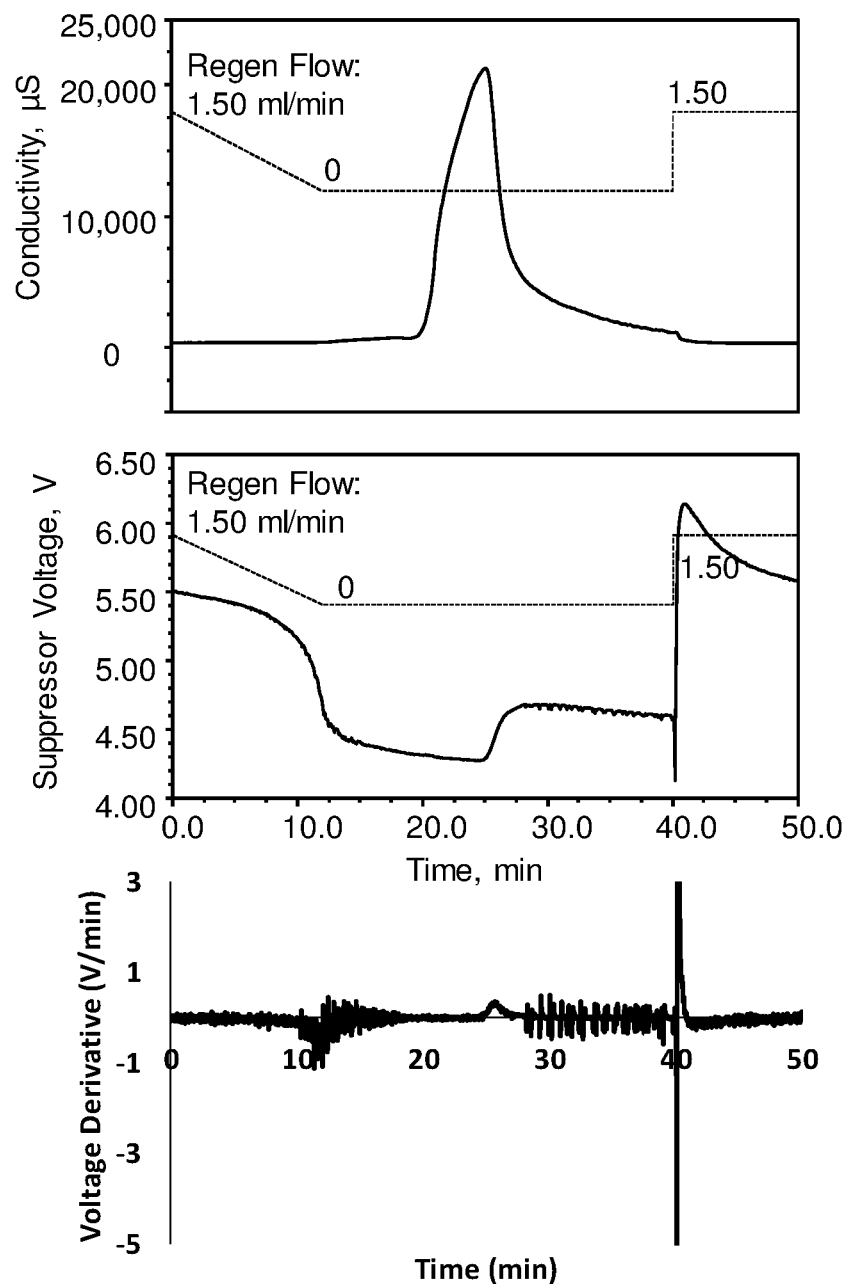
FIG. 9(C) are conductivity, suppressor voltage, and voltage derivative profiles of a NaOAc/NaOH gradient eluent with gradual regenerant flow loss. Eluent: 10 mM NaOAc/100 mM NaOH during 0-5 min; 10 mM NaOAc to 100 mM NaOAc in 100 mM NaOH during 5-20 min; 100 mM NaOAc/100 mM NaOH during 20-50 min; eluent flow rate: 0.25 mL/min; regenerant flow rate: 1.5-0 mL/min during 0-10 min, 0 mL/min during 10-40 min, 1.5 mL/min during 40-50 min; suppressor: Thermo Scientific Dionex ERD 500 2-mm; suppressor current: 150 mA.
Figure 10A:
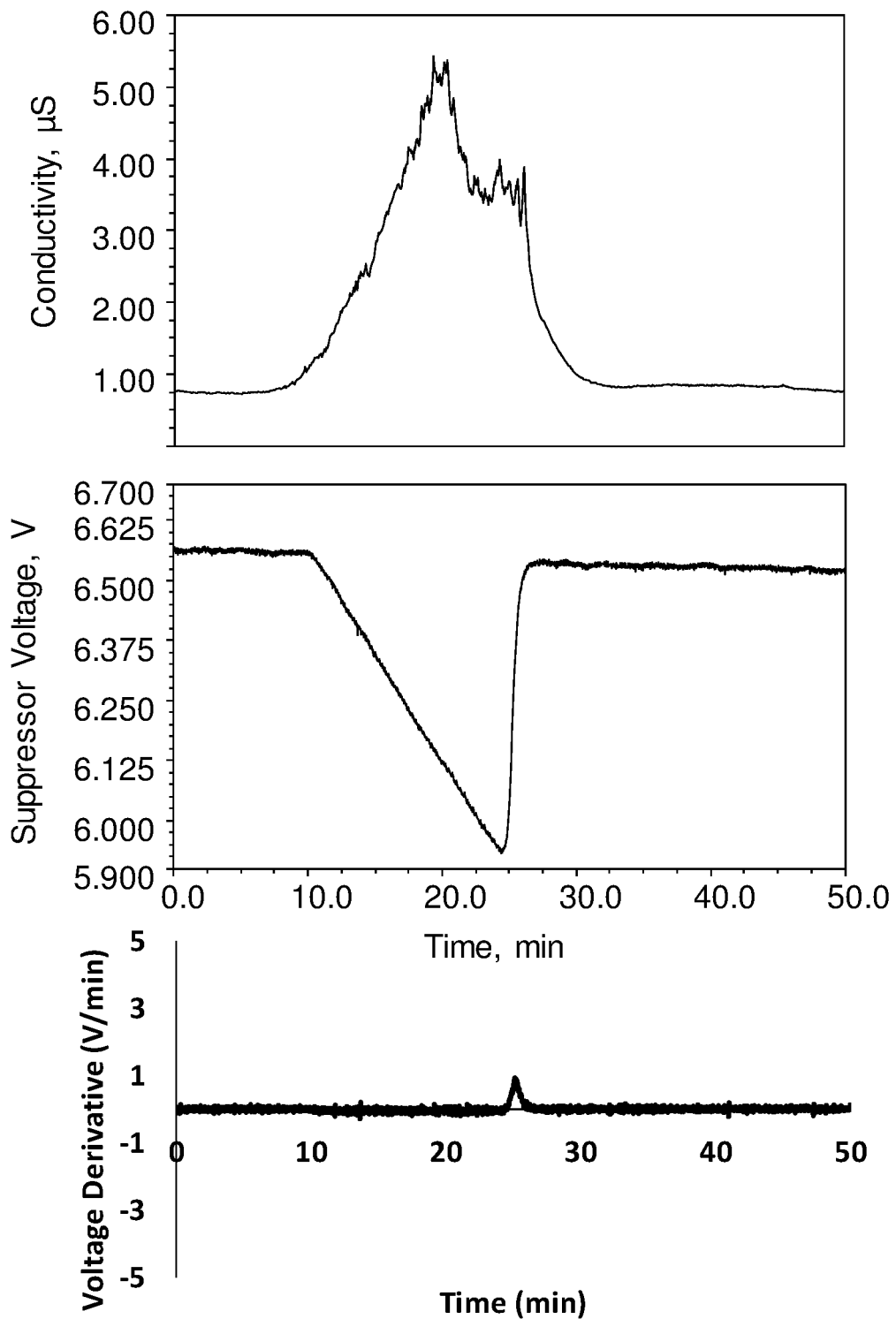
FIG. 10(A) are conductivity, suppressor voltage, and voltage derivative profiles of a NaOH gradient eluent with normal regenerant flow. Eluent: 10 mM NaOH during 0-5 min; 10 mM-100 mM NaOH during 5-20 min; 10 mM NaOH during 20-50 min; eluent flow rate: 0.25 mL/min; normal regenerant flow rate: 1.5 mL/min; suppressor: Thermo Scientific Dionex ERD 500 2-mm; suppressor current: 150 mA.
Figure 10B:
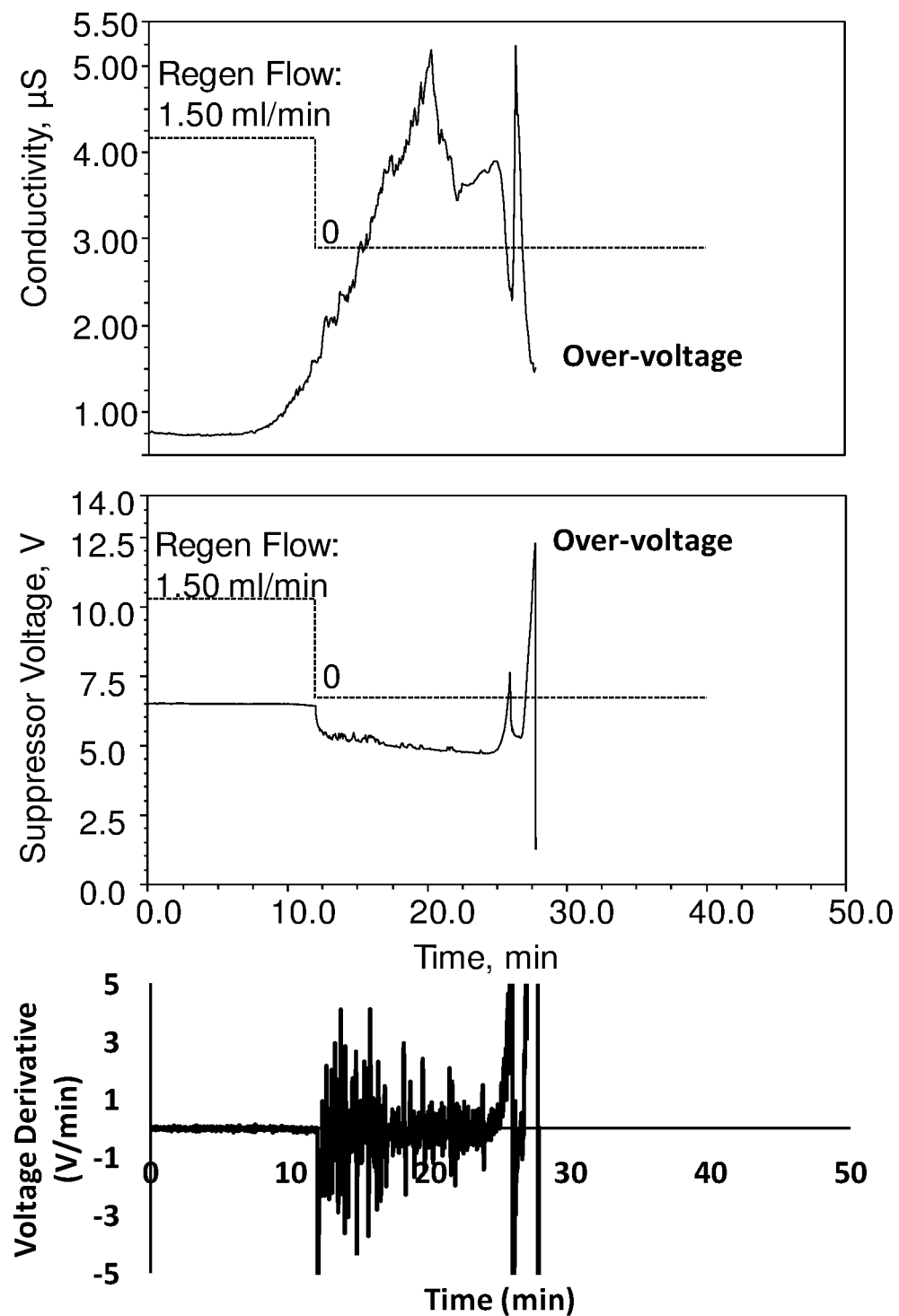
FIG. 10(B) are conductivity, suppressor voltage, and voltage derivative profiles of a NaOH gradient eluent with sudden regenerant flow loss. Eluent: 10 mM NaOH during 0-5 min; 10 mM-100 mM NaOH during 5-20 min; 10 mM NaOH during 20-50 min; eluent flow rate: 0.25 mL/min; regenerant flow rate: 1.5 mL/min during 0-10 min, 0 mL/min during 10-40 min, 1.5 mL/min during 40-50 min; suppressor: Thermo Scientific Dionex ERD 500 2-mm; suppressor current: 150 mA.

For the sudden loss of regenerant flows, in both FIGS. 9(B) and 10(B), an instant spike in the voltage derivative (magnitude larger than −5 V/min) is registered at 10 min. The conductivity is shown to significantly increase within a few minutes. The spike in the voltage derivative is therefore effective in indicating the flow interruption.

Figure 10C:
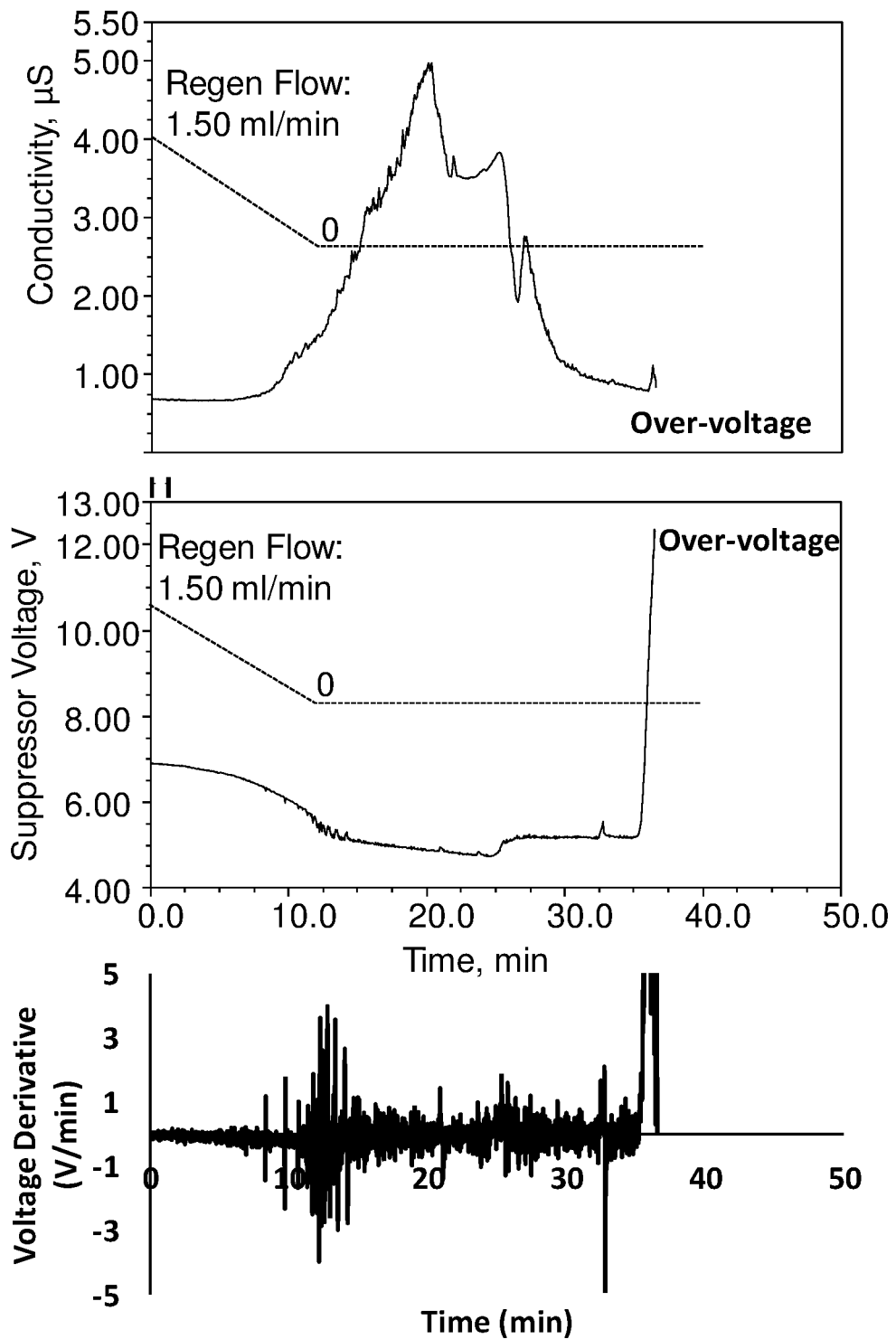
FIG. 10(C) are conductivity, suppressor voltage, and voltage derivative profiles of a NaOH gradient eluent with gradual regenerant flow loss. Eluent: 10 mM NaOH during 0-5 min; 10 mM-100 mM NaOH during 5-20 min; 10 mM NaOH during 20-50 min; eluent flow rate: 0.25 mL/min; regenerant flow rate: 1.5-0 mL/min during 0-10 min, 0 mL/min during 10-40 min, 1.5 mL/min during 40-50 min; suppressor: Thermo Scientific Dionex ERD 500 2-mm; suppressor current: 150 mA.

For the gradual regenerant flow loss, a consistent spike of magnitude larger than −1 V/min is observed before and at 10 min where the flow finally stops. Within a few minutes, the conductivity starts to increase, indicating the breakthrough of the salts. Therefore, using the −1 V/min as the threshold for the valve switching is still effective. In the case of FIG. 10(C), where the eluent is 100 mM NaOH and the conductivity profile doesn't change from the regenerant flow interruptions, the capacity of the suppressor is capable of suppressing the relatively lower eluent concentration, the spikes showing up on the voltage derivative graph are still effective in indicating the regenerant flow interruptions and can be used for the trigger mechanism.

Figure 11:
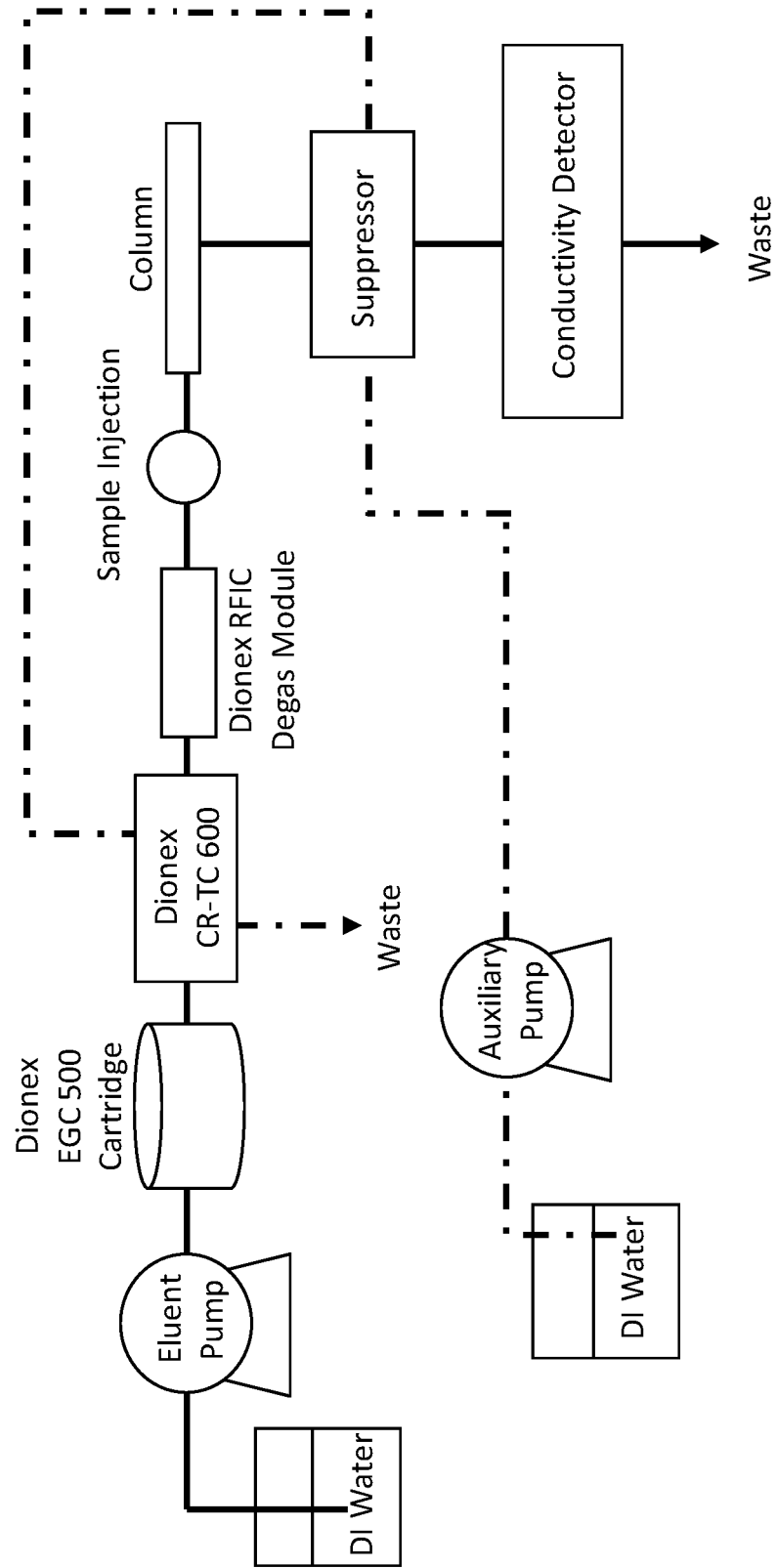
FIG. 11 is a schematic of a regen-free ion chromatography (RFIC) system for a feasibility study.
Figure 12:
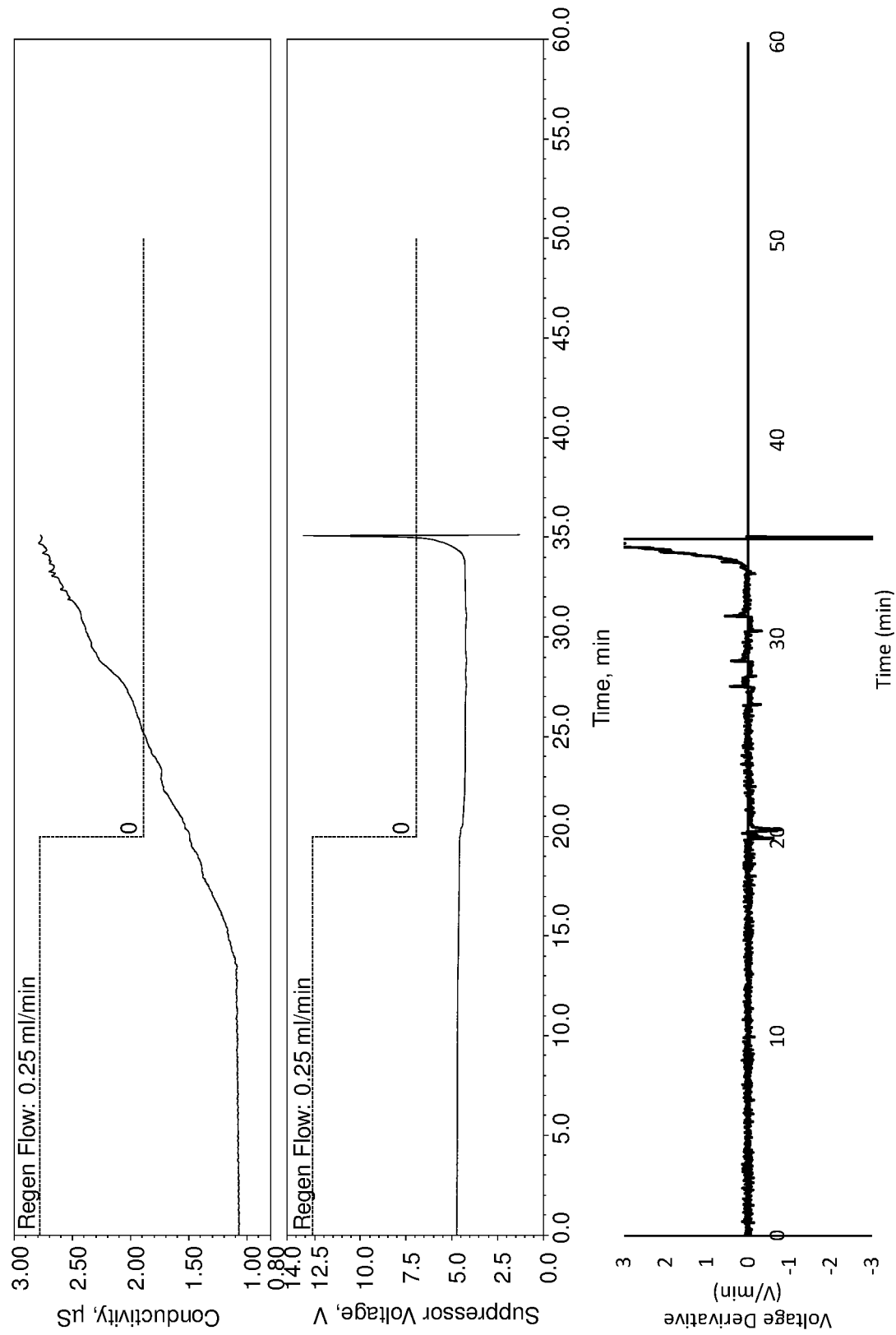
FIG. 12 are conductivity, suppressor voltage, and voltage derivative profiles of an electrolytically generated gradient eluent condition with sudden regenerant flow loss in an RFIC system. Eluent generator: Dionex EGC 500 KOH; eluent: 10 mM KOH during 0-10 min, 10-100 mM KOH during 10-30 min, 100 mM KOH during 30-60 min; eluent flow rate: 0.25 mL/min; normal regenerant flow rate: 0.25 mL/min; regenerant flow rate: 0.25 mL/min during 0-20 min, 0 mL/min during 20-50 min, 0.25 mL/min during 50-60 min; suppressor: Dionex ADRS 600 2-mm; suppressor current: 62 mA.

The effect of the regenerant flow disruption was also examined on a RFIC system with KOH eluent generated by a Dionex EGC 500 KOH cartridge (FIG. 11). As shown in FIG. 12, when the regenerant flow was stopped at 20 min, an instant negative spike was registered in the voltage derivative plot, which can be used to trigger the mechanism to protect the MS. In this example, due to the loss of regenerant flow, the suppressor voltage reached the maximum settings and interrupted the run at around 35 min.

Example 3: Effect of Reduced Regen Flows on Suppressor Performance (Testing Boundary Condition)

Figure 13A:
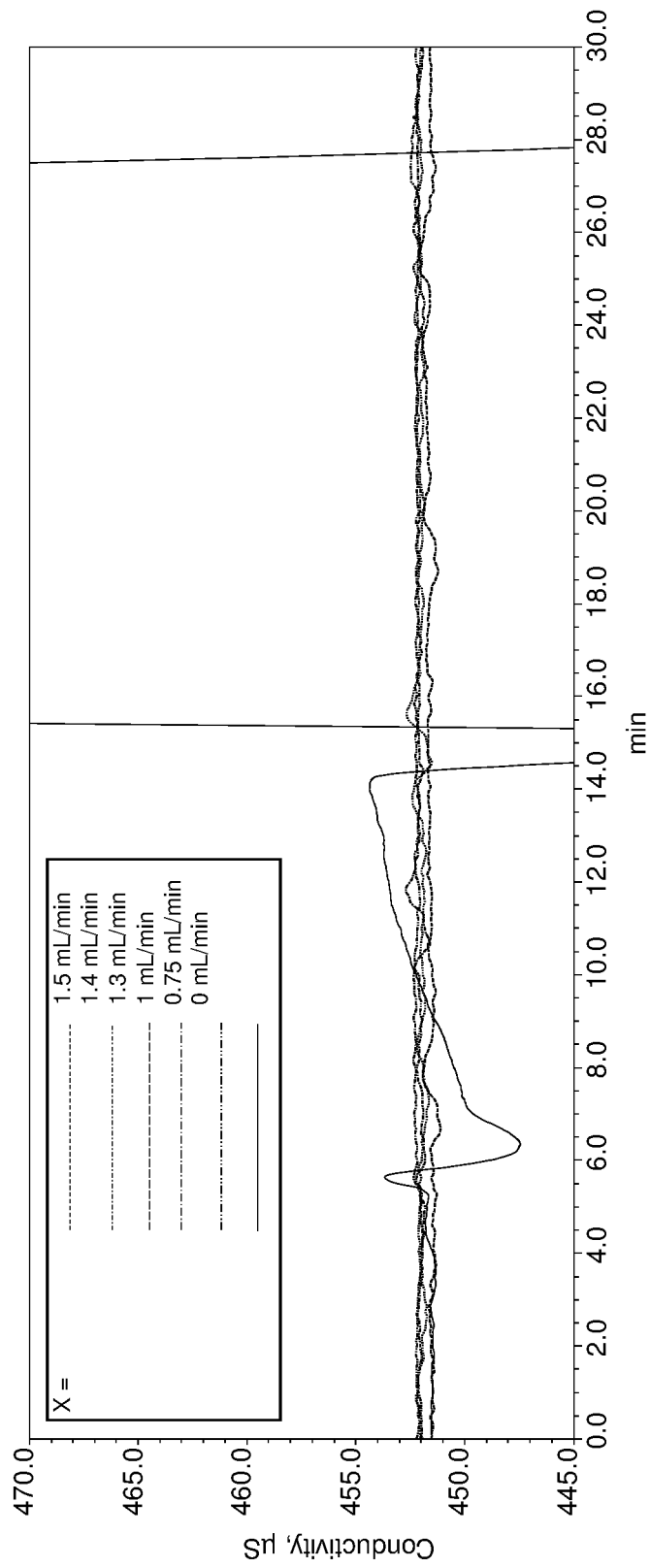
FIG. 13(A) are conductivity traces of varied regenerant flows. Eluent: 100 mM NaOAc in 100 mM NaOH; eluent flow rate: 0.25 mL/min; normal regenerant flow rate: 1.5 mL/min; suppressor: Dionex ERD 500 2-mm; suppressor current: 150 mA. X is the reduced regenerant flow rate and the value of X is indicated in the legend.
Figure 13B:
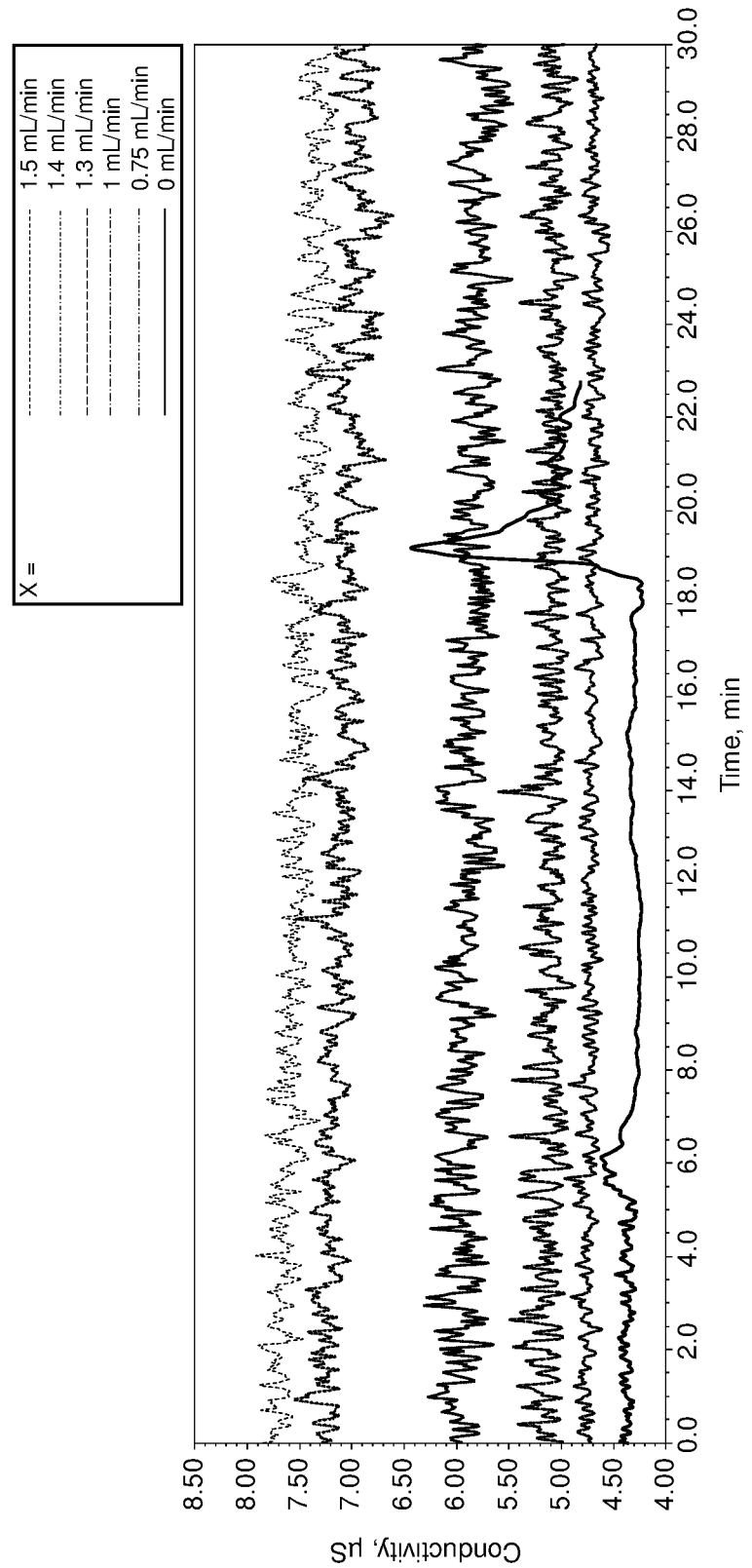
FIG. 13(B) are conductivity traces of varied regenerant flows. Eluent: 100 mM NaOH; eluent flow rate: 0.25 mL/min; normal regenerant flow rate: 1.5 mL/min; suppressor: Dionex ERD 500 2-mm; suppressor current: 150 mA. X is the reduced regenerant flow rate and the value of X is indicated in the legend.

To check the effect of the reduced regenerant flow on the suppressor performance, a series of regenerant flow rates were examined. In the testing, the regenerant flow was set to drop to various rates ranging from 1.4 to 0 mL/min (value X). As shown in FIGS. 13(A) and 13(B), the conductivity response doesn't change much corresponding to the regenerant flow changes, in both the NaOAc/NaOH (FIG. 13(A)) and NaOH (FIG. 13(B)) eluent systems, except for the zero flow.

Figure 14:
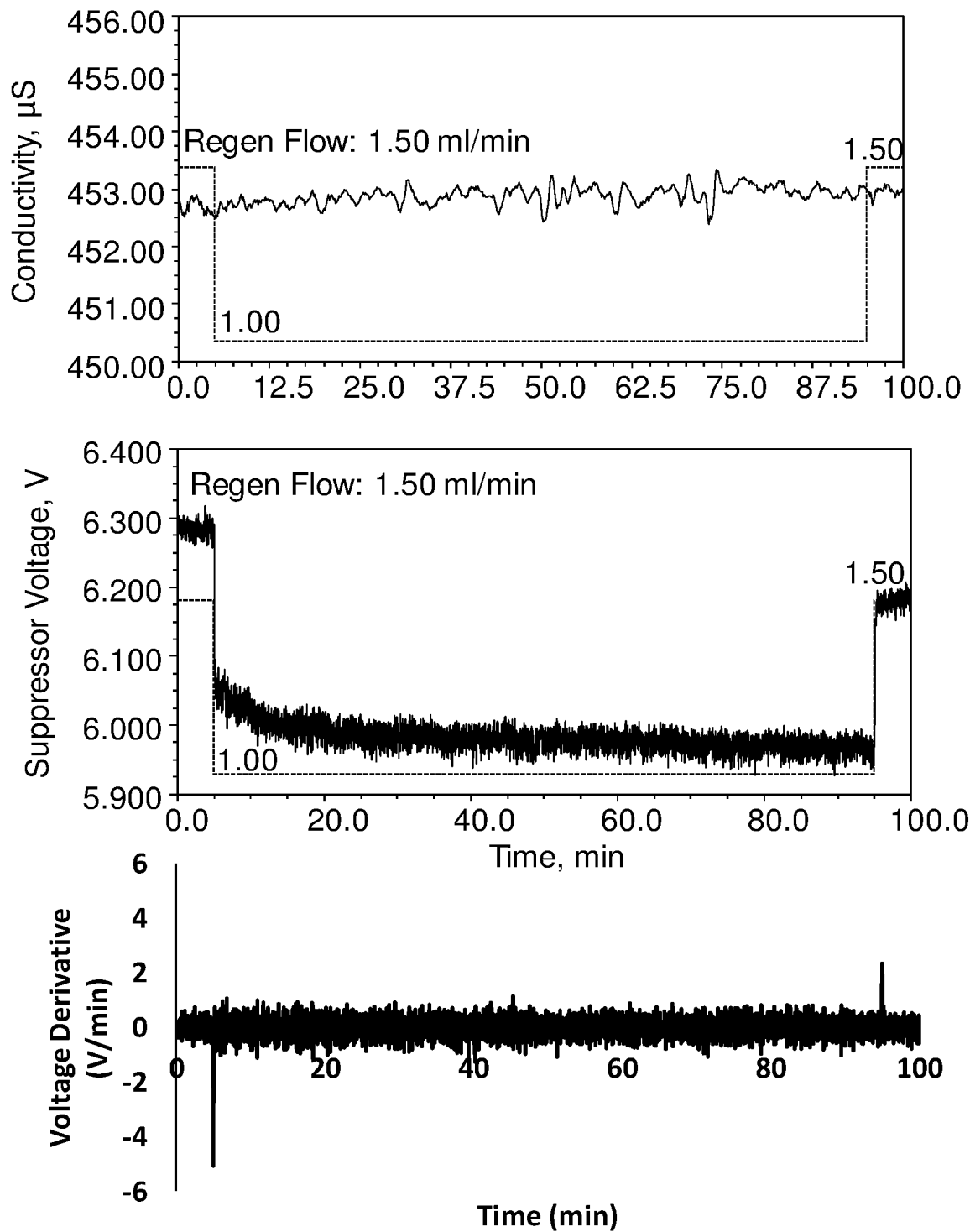
FIG. 14 are conductivity, suppressor voltage, and voltage derivative profiles of a 100 mM NaOAc/100 mM NaOH eluent with sudden regenerant flow loss. Eluent flow rate: 0.25 mL/min; regenerant flow rate: 1.5 mL/min during 0-5 min, 0 mL/min during 5-95 min, 1.5 mL/min during 95-100 min; suppressor: Dionex ERD 500 2-mm; suppressor current: 150 mA.

To check if the reduced regenerant flow over extensive period of time will affect the suppressor performance or not, a longer testing time of 90 min was examined. As shown in FIG. 14, the regenerant flow was reduced by 30% at 5 min, and continuously run for 90 min before the regenerant flow was resumed back to 100% at 95 min. The sudden flow drop generates the spike of larger than −5 V/min in the voltage derivative, which can be used for the trigger mechanism, while the eluent is still effectively suppressed.

Figure 15A:
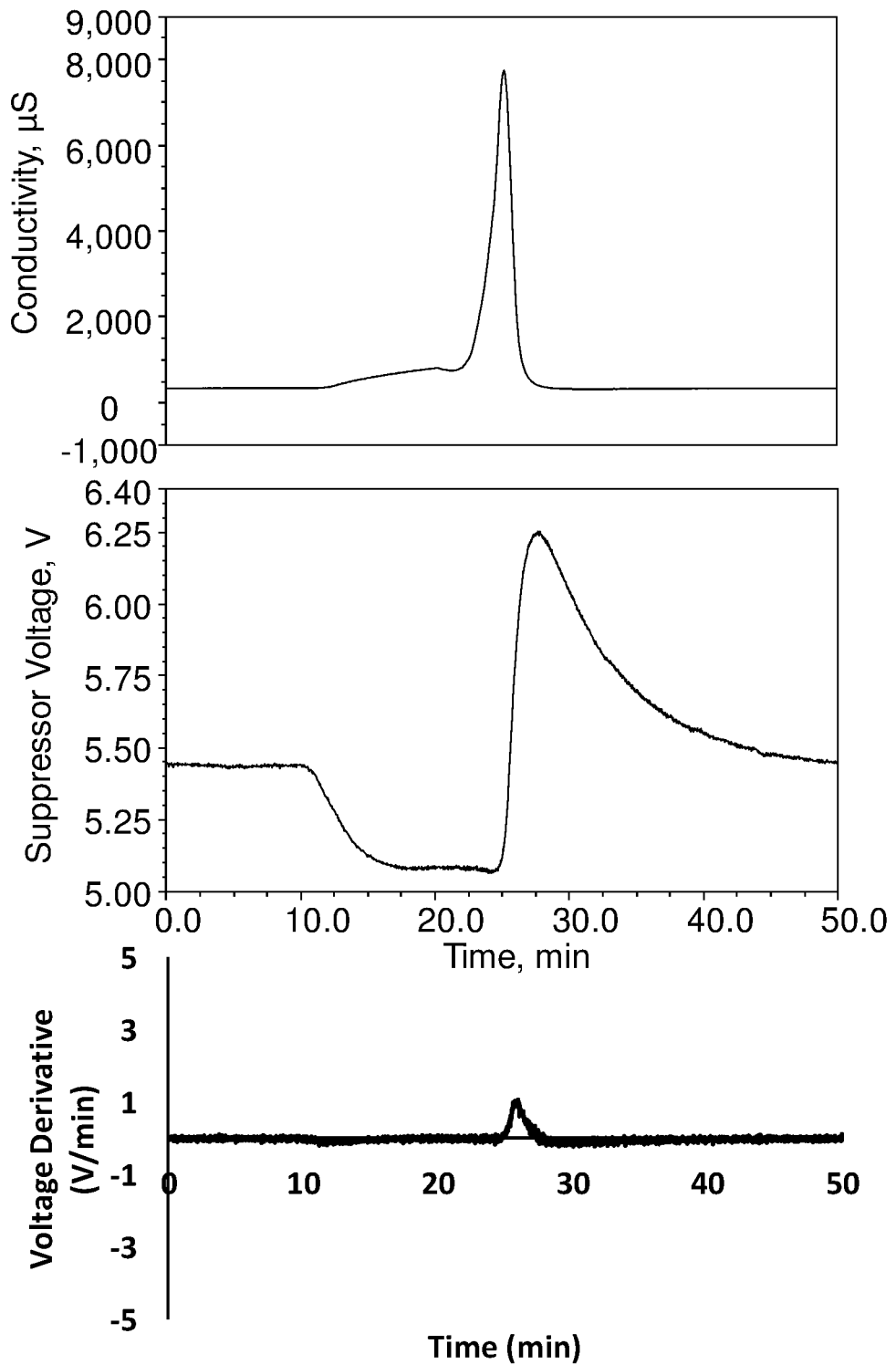
FIG. 15(A) are conductivity, suppressor voltage, and voltage derivative profiles of varied NaOAc/NaOH gradient eluent conditions. Eluent: 10 mM NaOAc during 0-5 min, 10 mM NaOAc to 100 mM NaOAc in 100 mM NaOH during 5-20 min 100 mM NaOAc during 20-50 min; eluent flow rate: 0.25 mL/min; regenerant flow rate: 1.5 mL/min; suppressor: Dionex ERD 500 2-mm; suppressor current: 150 mA.
Figure 15B:
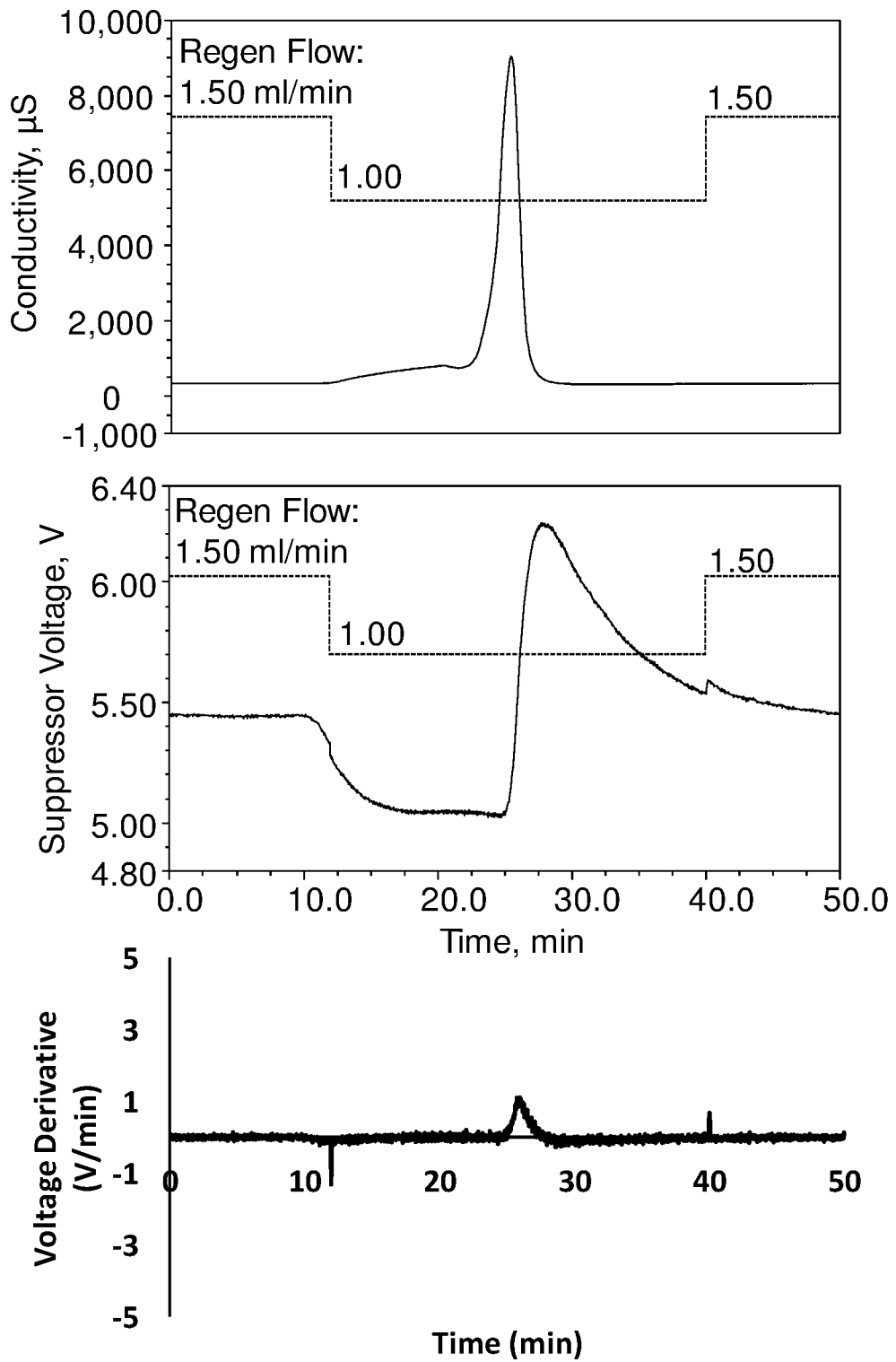
FIG. 15(B) are conductivity, suppressor voltage, and voltage derivative profiles of varied NaOAc/NaOH gradient eluent conditions with sudden regenerant flow reduction. Eluent: 10 mM NaOAc during 0-5 min, 10 mM NaOAc to 100 mM NaOAc in 100 mM NaOH during 5-20 min 100 mM NaOAc during 20-50 min; eluent flow rate: 0.25 mL/min; regenerant flow rate: 1.5 mL/min during 0-10 min, 1.0 mL/min during 10-40 min, 1.5 mL/min during 40-50 min; suppressor: Dionex ERD 500 2-mm; suppressor current: 150 mA.
Figure 15C:
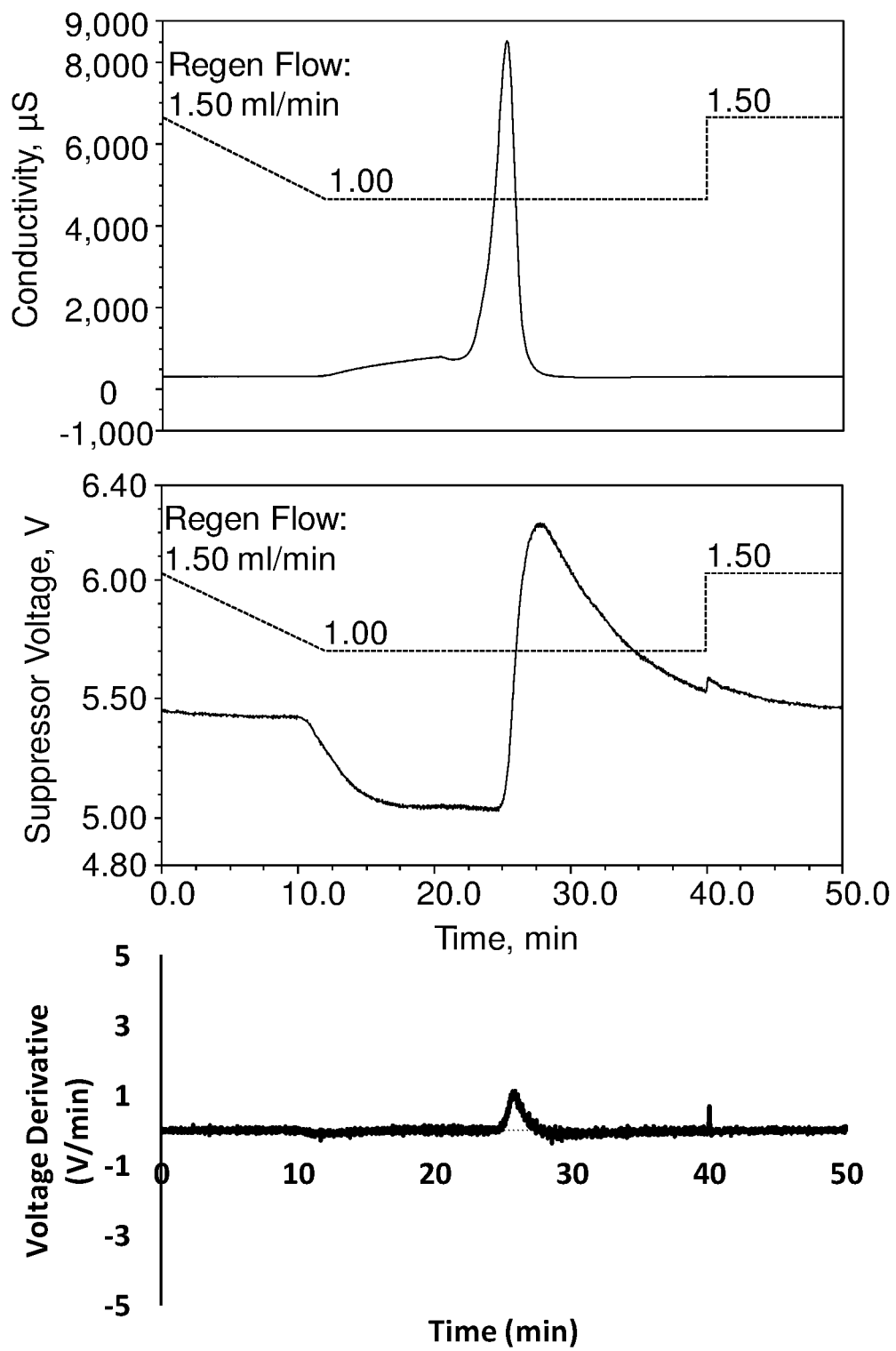
FIG. 15(C) are conductivity, suppressor voltage, and voltage derivative profiles of varied NaOAc/NaOH gradient eluent conditions with sudden regenerant flow reduction. Eluent: 10 mM NaOAc during 0-5 min, 10 mM NaOAc to 100 mM NaOAc in 100 mM NaOH during 5-20 min 100 mM NaOAc during 20-50 min; eluent flow rate: 0.25 mL/min; regenerant flow rate: 1.5-1 mL/min during 0-10 min, 1.0 mL/min during 10-40 min, 1.5 mL/min during 40-50 min; suppressor: Dionex ERD 500 2-mm; suppressor current: 150 mA.
Figure 16A:
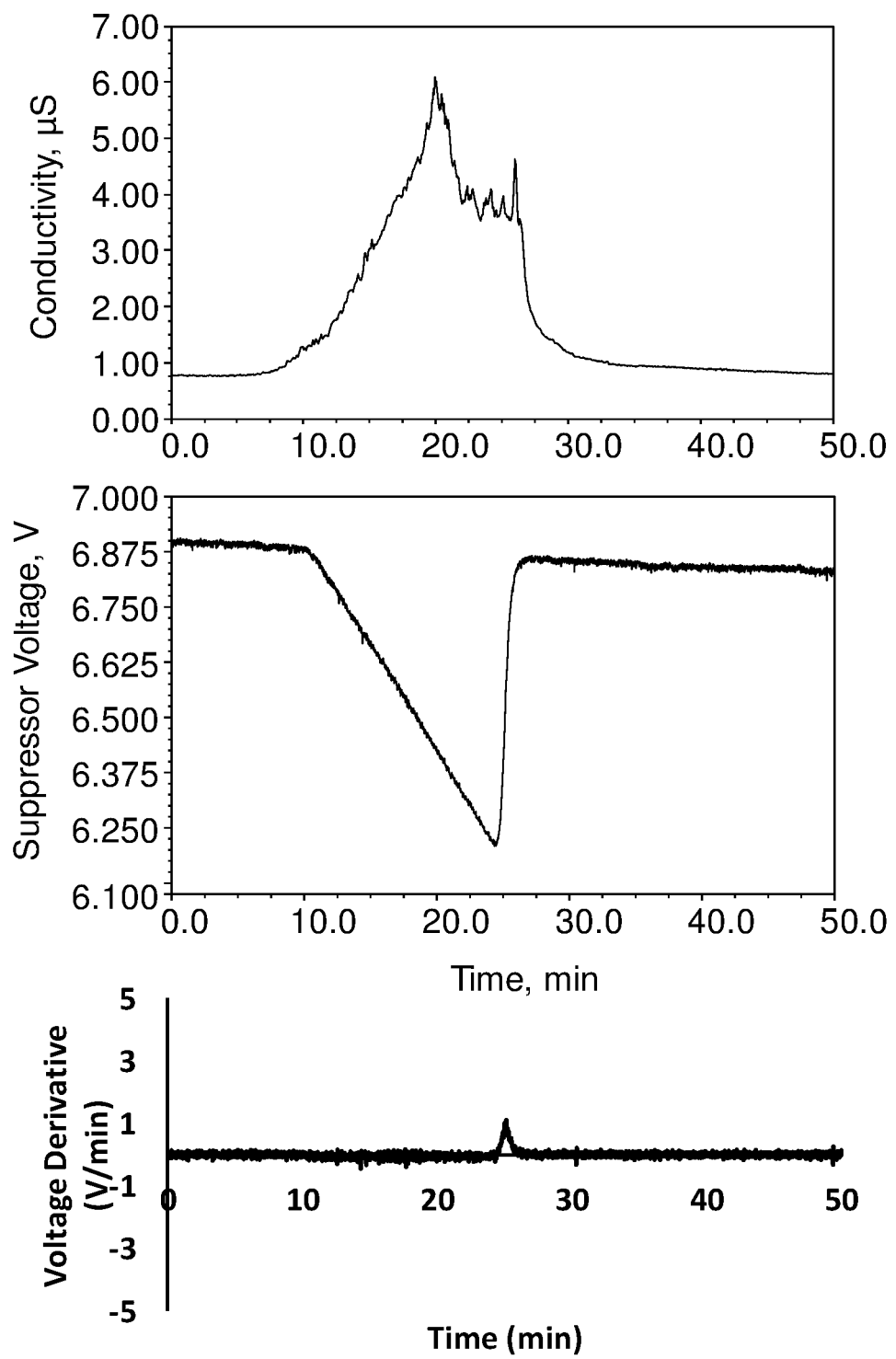
FIG. 16(A) are conductivity, suppressor voltage and voltage derivative profiles of varied NaOH gradient eluent conditions with normal regenerant flow. Eluent: 10 mM NaOH during 0-5 min, 10 mM-100 mM NaOH during 5-20 min, 100 mM NaOH during 20-50 min; eluent flow rate: 0.25 mL/min; regenerant flow rate: 1.5 mL/min; suppressor: Dionex ERD 500 2-mm; suppressor current: 150 mA.
Figure 16B:
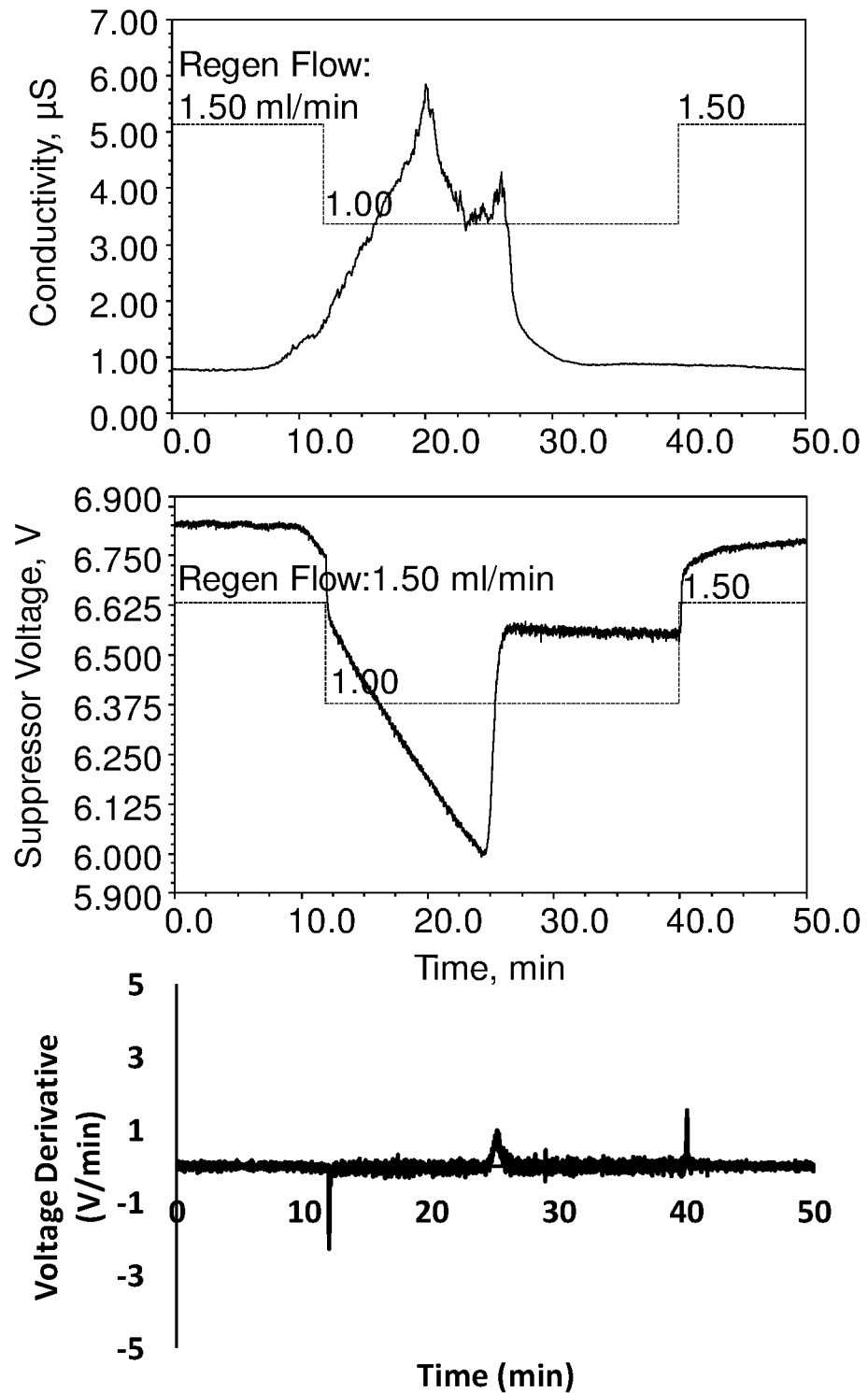
FIG. 16(B) are conductivity, suppressor voltage, and voltage derivative profiles of varied NaOH gradient eluent conditions with sudden regenerant flow reduction. Eluent: 10 mM NaOH during 0-5 min, 10 mM-100 mM NaOH during 5-20 min, 100 mM NaOH during 20-50 min; eluent flow rate: 0.25 mL/min; regenerant flow rate: 1.5 mL/min during 0-10 min, 1.0 mL/min during 10-40 min, 1.5 mL/min during 40-50 min; suppressor: Dionex ERD 500 2-mm; suppressor current: 150 mA.
Figure 16C:
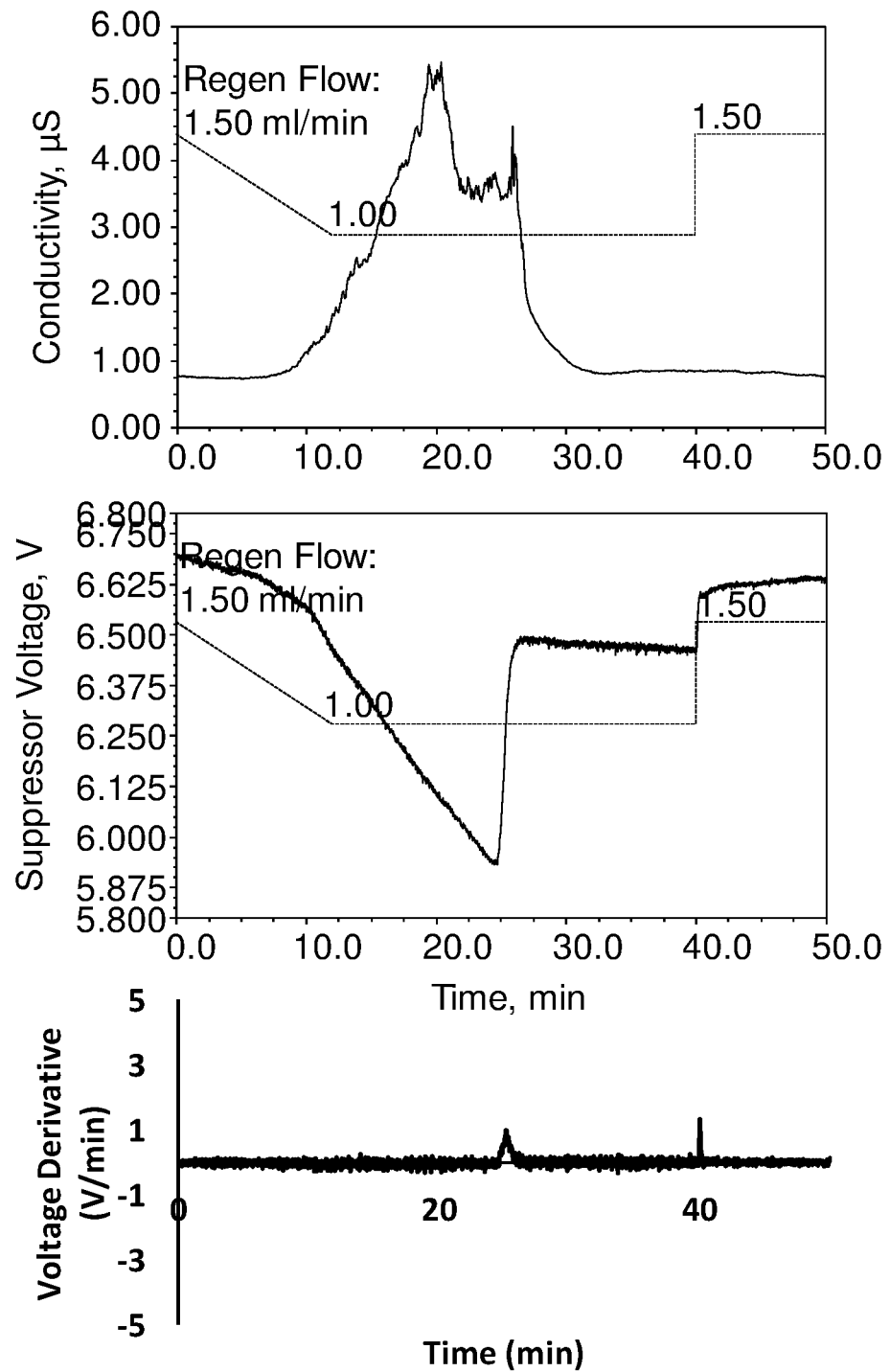
FIG. 16(C) are conductivity, suppressor voltage, and voltage derivative profiles of varied NaOH gradient eluent conditions with gradual regenerant flow loss. Eluent: 10 mM NaOH during 0-5 min, 10 mM-100 mM NaOH during 5-20 min, 100 mM NaOH during 20-50 min; eluent flow rate: 0.25 mL/min; regenerant flow rate: 1.5-1 mL/min during 0-10 min, 1.0 mL/min during 10-40 min, 1.5 mL/min during 40-50 min; suppressor: Dionex ERD 500 2-mm; suppressor current: 150 mA.

The sudden and gradual flow reduction was also examined under gradient conditions. As shown in FIGS. 15(A)-15(C), with 10-100 mM NaOAc and FIGS. 16(A)-16(C), with 10-100 mM NaOH eluent, when the regenerant flow suddenly drops from 1.5 to 1 mL/min at 10 min, an instant spike of magnitude larger than −1 V/min is shown in the voltage derivative. The magnitude of the peak in the conductivity trace resulting from the eluent gradient is shown to be higher than that under the normal regenerant flow condition, indicating some salt breakthrough from the reduced regenerant flow. The spike in the voltage derivative is effective for the trigger mechanism. When it's the gradual flow reduction from 1.5 to 1 mL/min during 0-10 min, the effect on the voltage derivative is not as significant (i.e. less than −1 V/min), therefore it's hard to used it to indicate the regenerant flow changes. However, as indicated in the conductivity trace, the eluent suppression is not affected under such conditions, similar to the reduced regenerant flow cases in FIGS. 13 and 14, therefore it's not detrimental to the MS.

Example 4: Increased Backpressure in the Eluent Channel

One of the most common suppressor failure modes is suppressor leaks caused by excessive backpressure at the downstream of the suppressor outlet due to particle clogging the tubing or the ESI capillary tube.

Figure 17:
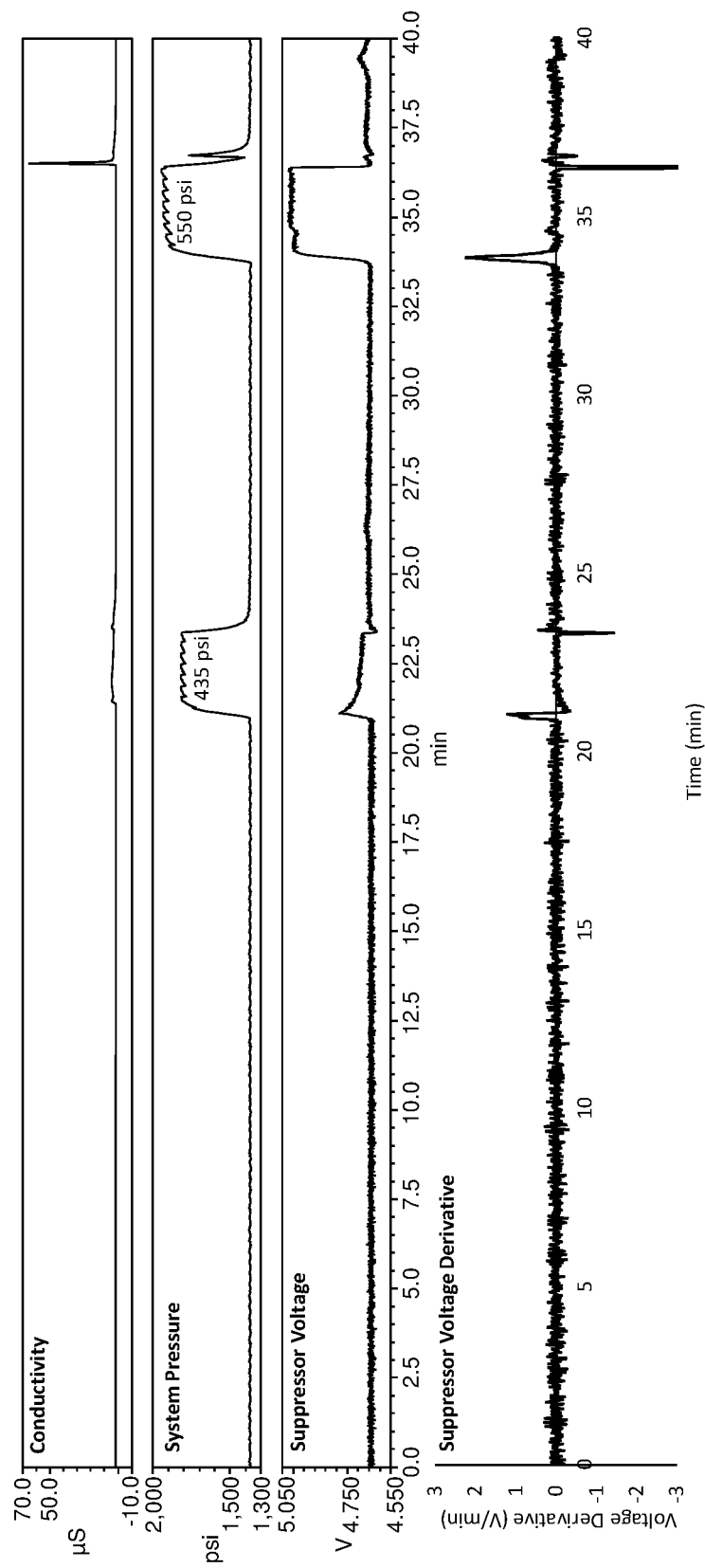
FIG. 17 are conductivity, system pressure, suppressor voltage, and voltage derivative profiles. Eluent: 100 mM KOH; eluent flow rate: 0.25 mL/min; suppressor: Thermo Scientific Dionex ADRS 2-mm; suppressor current: 62 mA; regenerant flow rate: 0.25 mL/min.
Figure 18:
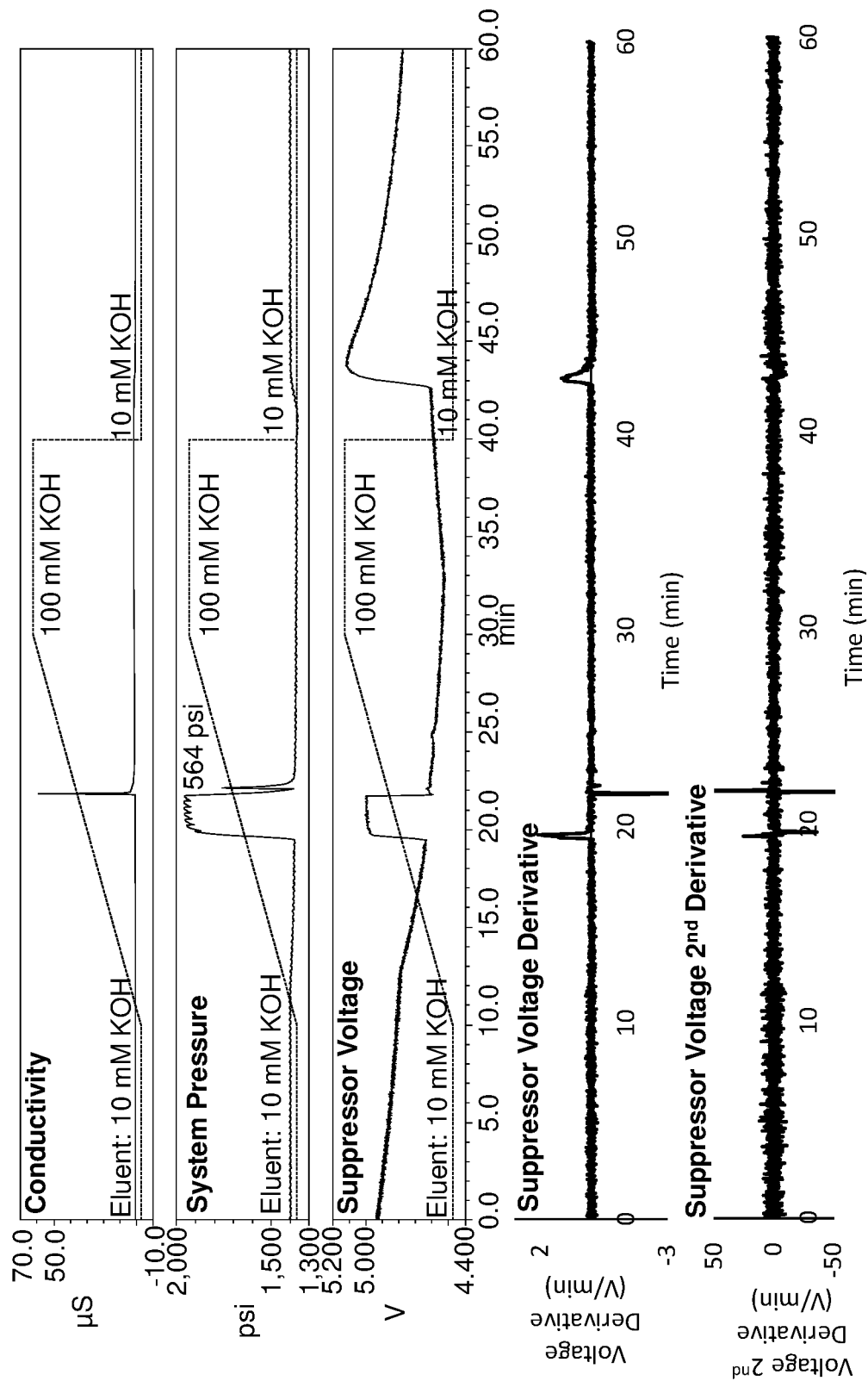
FIG. 18 are conductivity, system pressure, suppressor voltage and voltage derivative profiles. Eluent: 10 mM KOH during 0-10 min, 10-100 mM KOH during 10-30 min, 100 mM KOH during 30-40 min, 10 mM KOH during 40-60 min; eluent flow rate: 0.25 mL/min; suppressor: Thermo Scientific Dionex ADRS 2-mm; suppressor current: 62 mA; regenerant flow rate: 0.25 mL/min.

In the following example, to simulate the backpressure increase on the suppressor, a flow restrictor (Idex Adjustable BPR, P-880) was placed at the outlet of the conductivity detector to exert 400-600 psi backpressure to the suppressor (Dionex ADRS 600 2-mm) of a RFIC system (FIG. 11), at around 21 min and 34 min, respectively, as shown in the system pressure trace in FIG. 17. The duration of the flow restriction was roughly 2.5 min at each exertion. As shown in FIG. 17, positive spikes are observed responding to the increased backpressure at 21 min and 34 min respectively. It demonstrates that voltage derivative method is effective in indicating elevated backpressure exerted on the suppressor which causes the compromised performance of the device.

In the following example, the flow restriction was applied to the outlet of the conductivity detector to exert about 560 psi backpressure to the suppressor during a slope gradient. The duration of the flow restriction was roughly 2.5 min. As shown in FIG. 15, in addition to the positive spike at around 19.5 min corresponding to the increased backpressure, there is a positive peak at around 42.5 min as a result of a step gradient from 100 mM KOH to 10 mM KOH. To avoid the false signal on the voltage derivatives, a second derivative was applied. As shown in the Suppressor Voltage $2^{nd}$ Derivative plot, the positive peak at 42.5 min is minimized while the spike at 19.5 min remains distinctive. This indicates that applying more than one derivative is effective in eliminating false indication caused by conditions which are not related to suppressor failures.

Figure 19:
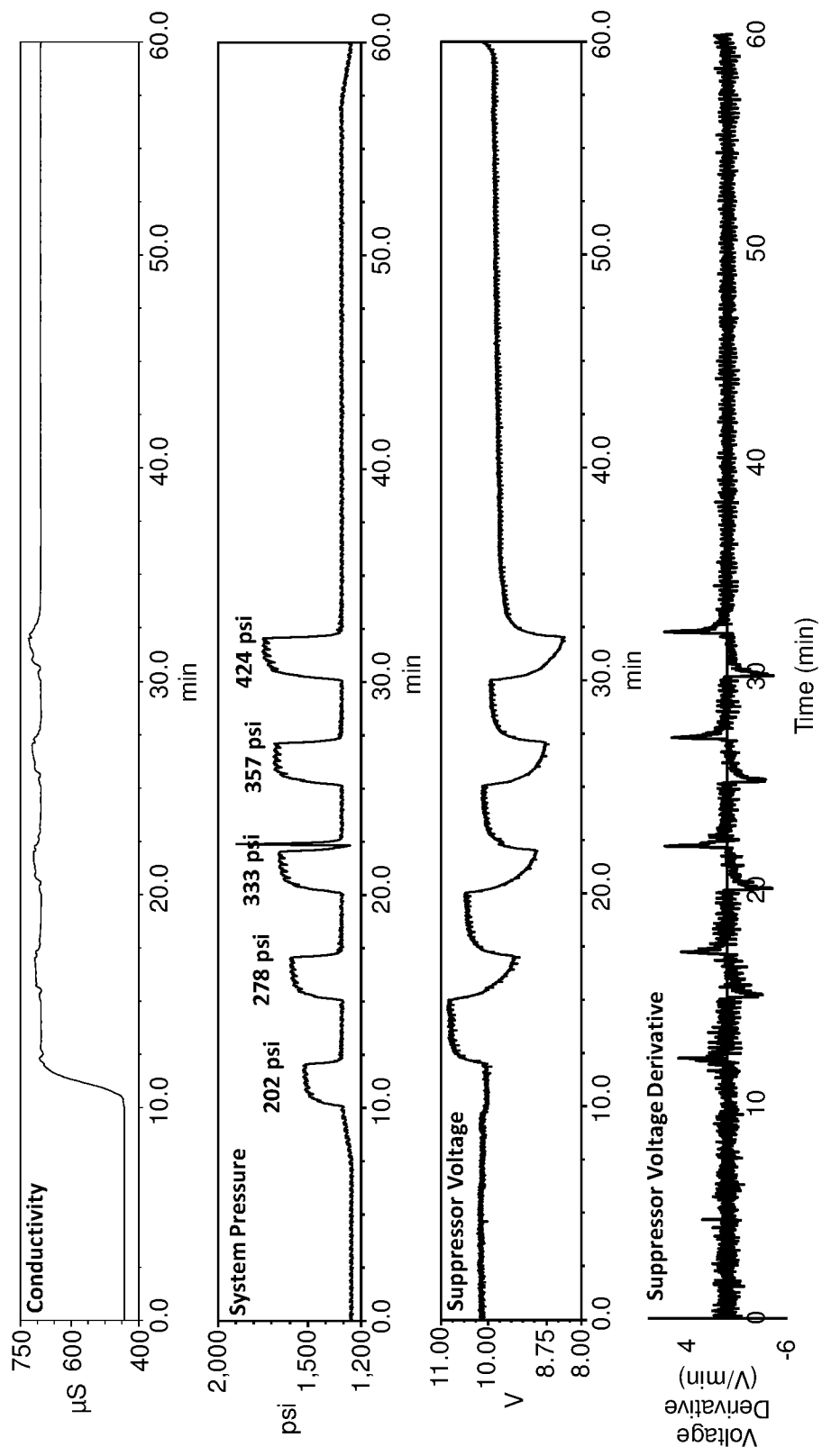
FIG. 19 are conductivity, system pressure, suppressor voltage and voltage derivative profiles. Eluent: 100 mM NaOAc/100 mM NaOH during 0-5 min, 250 mM NaOAc/ 100 mM NaOH during 5-55 min, 100 mM NaOAc/100 mM NaOH during 55-60 min; eluent flow rate: 0.25 mL/min; suppressor: Thermo Scientific Dionex ERD 500 2-mm; suppressor current: 250 mA; regenerant flow rate: 4 mL/min.

In the following example, to simulate the backpressure increase on the suppressor, a series of restriction tubing was placed at the outlet of the conductivity detector to exert 300-800 psi backpressure to the suppressor (Dionex ERD 500 2-mm) of a HPAE system (FIG. 4), at around 10 min, 15 min, 20 min, 25 min, and 30 min, respectively, as shown in the system pressure trace in FIG. 19. The duration of the flow restriction was roughly 2 min at each exertion. The system pressure trace shows lower pressure increase readings than the theoretical pressure readings calculated based on inner diameter and length of the tubing, especially at higher exerted backpressure. The suppressor starts to leak at elevated backpressure which dissipates the increased system pressure. As shown in FIG. 19, negative spikes are observed responding to the increased backpressure. It demonstrates that voltage derivative method is effective in indicating elevated backpressure exerted on the suppressor which causes the compromised performance of the device.

What is claimed is:

1. A method for detecting suppressor failure of a suppressor fluidically coupled to a chromatography column, the method comprising:
   flowing an eluent from the chromatography column to a suppressor;
   applying electrical current to and from a negative and a positive electrode of the suppressor;
   measuring the voltage across the negative and positive electrodes of the suppressor;
   calculating a monitored value as one of:
   a) the time derivative of the voltage,
   b) the time derivative of the moving average voltage, wherein the moving average voltage is the average voltage of 2 to 20 measurements,
   c) the moving average of the time derivative of the voltage, wherein the moving average of the time derivative is the average time derivative of 2 to 20 time derivatives,
   d) the moving average of the time derivative of the moving average of the voltage,
   e) the higher time derivative of the voltage,
   f) the higher time derivative of the moving average voltage, and
   g) the moving average of the higher time derivative of the voltage; and
   upon detecting the monitored value above a threshold value determining that there is a suppressor failure.

2. The method of claim 1, wherein the monitored value is the derivative of the voltage.

3. The method of claim 1, wherein the monitored value is the time derivative of the moving average voltage.

4. The method of claim 1, wherein the monitored value is the moving average of the time derivative of the voltage.

5. The method of claim 1, wherein the monitored value is the second time derivative of the voltage.

6. The method of claim 1, wherein the higher time derivative is the second time derivative.

7. The method of claim 1, wherein the eluent comprises a mixture of alkali acetate and alkali hydroxide, or alkali hydroxide, or alkali carbonate, or a mixture of alkali carbonate and bicarbonate, or a strong acid.

8. The method of claim 1, wherein upon determining that there is a suppressor failure, a pump that flows the eluent is stopped.

9. The method of claim 1, further comprising:
flowing the eluent from suppressor to a mass spectrometer;
wherein upon determining that there is a suppressor failure, interrupting the flow from the suppressor to the mass spectrometer.

10. The method of claim 9, further comprising supplying a liquid comprising water to the mass spectrometer in place of the eluent when the flow is interrupted.

11. The method of claim 1, further comprising flowing the eluent from the chromatography column or the suppressor to a conductivity cell.

12. A system control unit for a chromatography system comprising a chromatography column fluidically coupled to a suppressor, wherein the system control unit is configured to:
measure the voltage across the negative and positive electrodes of the suppressor;
calculate a monitored value as one of:
a) the time derivative of the voltage,
b) the time derivative of the moving average voltage, wherein the moving average voltage is the average voltage of 2 to 20 measurements,
c) the moving average of the time derivative of the voltage, wherein the moving average of the time derivative is the average time derivative of 2 to 20 time derivatives,
d) the moving average of the time derivative of the moving average of the voltage,
e) the higher time derivative of the voltage,
f) the higher time derivative of the moving average voltage, and
g) the moving average of the higher time derivative of the voltage; and
determine that there is a suppressor failure upon detecting the monitored value is above a threshold value.

13. The system control unit of claim 12, wherein the monitored value is the derivative of the voltage.

14. The system control unit of claim 12, wherein the monitored value is the time derivative of the moving average voltage.

15. The system control unit of claim 12, wherein the monitored value is the moving average of the time derivative of the voltage.

16. The system control unit of claim 12, wherein the monitored value is the second time derivative of the voltage.

17. The system control unit of claim 12, wherein the system control unit is configured so that upon determining that there is a suppressor failure, a pump that flows the eluent is stopped.

18. The system control unit of claim 12, wherein in chromatography system the suppressor is fluidically coupled to a mass spectrometer;
wherein the system control unit is configured so that upon determining that there is a suppressor failure, the flow from the suppressor to the mass spectrometer is interrupted.

19. The system control unit of claim 18, wherein the system control unit is configured to supply a liquid comprising water to the mass spectrometer in place of the eluent when the flow is interrupted.

20. The system control unit of claim 12, wherein a conductivity cell is fluidically coupled to the suppressor.

* * * * *